(12) United States Patent
Correll et al.

(10) Patent No.: US 11,783,266 B2
(45) Date of Patent: Oct. 10, 2023

(54) SURFACING VISUALIZATION MIRAGES

(71) Applicant: Tableau Software, LLC, Seattle, WA (US)

(72) Inventors: Michael Arthur Correll, Seattle, WA (US); Andrew Michael McNutt, Chicago, IL (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 16/732,027

(22) Filed: Dec. 31, 2019

(65) Prior Publication Data

US 2021/0081874 A1 Mar. 18, 2021

Related U.S. Application Data

(60) Provisional application No. 62/902,273, filed on Sep. 18, 2019.

(51) Int. Cl.
  *G06Q 10/00* (2023.01)
  *G06Q 10/0639* (2023.01)

(52) U.S. Cl.
  CPC .............................. *G06Q 10/06393* (2013.01)

(58) Field of Classification Search
  CPC combination set(s) only.
  See application file for complete search history.

(56) References Cited

U.S. PATENT DOCUMENTS

| 7,010,364 | B1 * | 3/2006 | Singh ............... G05B 19/41885 700/51 |
| 8,099,674 | B2 | 1/2012 | Mackinlay et al. |
| 8,589,811 | B2 | 11/2013 | Gotz |
| 8,983,994 | B2 | 3/2015 | Neels et al. |
| 9,335,911 | B1 | 5/2016 | Elliot et al. |
| 9,361,320 | B1 | 6/2016 | Vijendra et al. |
| 9,418,105 | B2 | 8/2016 | Buchheit et al. |

(Continued)

FOREIGN PATENT DOCUMENTS

| JP | 2007249354 A | 9/2007 |
| JP | 2008217480 A | 9/2008 |

(Continued)

OTHER PUBLICATIONS

Negash, Solomon, "Business Intelligence," Communications of the Association for Information Systems, 2004, vol. 13, pp. 177-195.

(Continued)

*Primary Examiner* — Matheus Ribeiro Stivaletti

(74) *Attorney, Agent, or Firm* — John W. Branch; Branch Partners PLLC

(57) ABSTRACT

Embodiments are directed to managing visualizations. Visualizations based on data from a data source may be provided. Assessment models based on the visualizations may be provided such that the assessment models may detect mirages in the visualizations. Assessment models may be employed to determine Assessment results based on the visualizations and the data from the data source such that each assessment result includes an assessment score that corresponds to a detection of mirages. Assessment results may be rank ordered based on the assessment score. A report may be provided that includes the rank ordered list of the assessment results.

24 Claims, 12 Drawing Sheets

(56) References Cited

U.S. PATENT DOCUMENTS

| | | |
|---|---|---|
| 9,613,086 B1 | 4/2017 | Sherman |
| 9,779,147 B1 | 10/2017 | Sherman et al. |
| 10,552,513 B1 | 2/2020 | Harkare |
| 10,572,544 B1 | 2/2020 | Zhang et al. |
| 10,572,804 B1 | 2/2020 | Hilley |
| 10,572,859 B1 | 2/2020 | Evans |
| 10,572,925 B1 | 2/2020 | Roy Chowdhury et al. |
| 10,592,525 B1 | 3/2020 | Khante et al. |
| 10,642,723 B1* | 5/2020 | Krishnamoorthy ....... G06F 8/40 |
| 10,705,695 B1 | 7/2020 | Porath et al. |
| 10,719,332 B1 | 7/2020 | Dwivedi et al. |
| 10,775,976 B1 | 9/2020 | Abdul-Jawad et al. |
| 10,929,415 B1 | 2/2021 | Shcherbakov et al. |
| 10,963,347 B1 | 3/2021 | Chen et al. |
| 11,074,301 B2 | 7/2021 | Williams et al. |
| 11,232,506 B1 | 1/2022 | Zielnicki |
| 2005/0134589 A1 | 6/2005 | Heer et al. |
| 2008/0168135 A1 | 7/2008 | Redlich et al. |
| 2011/0137850 A1 | 6/2011 | Mourey et al. |
| 2011/0296309 A1 | 12/2011 | Ngan |
| 2011/0302110 A1 | 12/2011 | Beers et al. |
| 2012/0229466 A1 | 9/2012 | Riche et al. |
| 2012/0233182 A1 | 9/2012 | Baudel et al. |
| 2013/0091465 A1 | 4/2013 | Kikin-Gil et al. |
| 2013/0103677 A1 | 4/2013 | Chakra et al. |
| 2013/0204894 A1 | 8/2013 | Faith et al. |
| 2014/0019443 A1 | 1/2014 | Golshan |
| 2014/0032548 A1 | 1/2014 | Gilra et al. |
| 2014/0059017 A1 | 2/2014 | Chaney et al. |
| 2014/0074889 A1 | 3/2014 | Neels et al. |
| 2014/0156223 A1 | 6/2014 | Toomre et al. |
| 2014/0344008 A1 | 11/2014 | Gammage et al. |
| 2015/0278214 A1 | 10/2015 | Anand et al. |
| 2016/0034305 A1 | 2/2016 | Shear et al. |
| 2016/0092408 A1 | 3/2016 | Lagerblad et al. |
| 2016/0092576 A1 | 3/2016 | Quercia et al. |
| 2016/0103908 A1 | 4/2016 | Fletcher et al. |
| 2016/0196534 A1 | 7/2016 | Jarrett et al. |
| 2016/0307210 A1 | 10/2016 | Agarwal et al. |
| 2016/0307233 A1 | 10/2016 | Pan et al. |
| 2016/0350950 A1* | 12/2016 | Ritchie ................ G06F 40/177 |
| 2016/0357829 A1 | 12/2016 | Fung et al. |
| 2016/0364770 A1 | 12/2016 | Denton et al. |
| 2017/0031449 A1 | 2/2017 | Karsten et al. |
| 2017/0061659 A1 | 3/2017 | Puri et al. |
| 2017/0069118 A1 | 3/2017 | Stewart |
| 2017/0124617 A1 | 5/2017 | Spoelstra et al. |
| 2017/0132489 A1 | 5/2017 | Simgi |
| 2017/0140118 A1 | 5/2017 | Haddad et al. |
| 2017/0154088 A1 | 6/2017 | Sherman |
| 2017/0154089 A1 | 6/2017 | Sherman |
| 2017/0220633 A1 | 8/2017 | Porath et al. |
| 2017/0308913 A1 | 10/2017 | Chao et al. |
| 2018/0004363 A1 | 1/2018 | Tompkins |
| 2018/0032492 A1 | 2/2018 | Altshuller et al. |
| 2018/0039399 A1 | 2/2018 | Kaltegaertner et al. |
| 2018/0121035 A1 | 5/2018 | Filippi et al. |
| 2018/0129369 A1 | 5/2018 | Kim et al. |
| 2018/0210936 A1 | 7/2018 | Reynolds et al. |
| 2018/0232405 A1 | 8/2018 | Samara et al. |
| 2018/0267676 A1 | 9/2018 | Glueck et al. |
| 2018/0343321 A1 | 11/2018 | Chang |
| 2019/0012553 A1 | 1/2019 | Maruchi et al. |
| 2019/0026681 A1 | 1/2019 | Polli et al. |
| 2019/0043506 A1 | 2/2019 | Rivkin et al. |
| 2019/0102425 A1 | 4/2019 | Obeidat |
| 2019/0108272 A1 | 4/2019 | Talbot et al. |
| 2019/0129964 A1 | 5/2019 | Corbin, II et al. |
| 2019/0130512 A1 | 5/2019 | Kuhn |
| 2019/0179621 A1 | 6/2019 | Salgado et al. |
| 2019/0188333 A1 | 6/2019 | Williams et al. |
| 2019/0213608 A1 | 7/2019 | Ouyang et al. |
| 2019/0339688 A1 | 11/2019 | Cella et al. |
| 2019/0355447 A1 | 11/2019 | Barkol et al. |
| 2020/0012939 A1 | 1/2020 | Hu et al. |
| 2020/0019546 A1 | 1/2020 | Luo et al. |
| 2020/0050636 A1 | 2/2020 | Datla et al. |
| 2020/0066397 A1 | 2/2020 | Rai et al. |
| 2020/0104731 A1 | 4/2020 | Oliner et al. |
| 2020/0134545 A1 | 4/2020 | Appel et al. |
| 2020/0233559 A1 | 7/2020 | Rueter et al. |
| 2020/0250472 A1 | 8/2020 | Abhyankar et al. |
| 2020/0250562 A1 | 8/2020 | Bly |
| 2020/0311680 A1 | 10/2020 | Wahl et al. |
| 2020/0320462 A1 | 10/2020 | Wang et al. |
| 2020/0372472 A1* | 11/2020 | Kenthapadi ........... G06F 16/903 |
| 2020/0403944 A1 | 12/2020 | Joshi et al. |
| 2020/0410001 A1 | 12/2020 | Sarkissian |
| 2021/0011961 A1 | 1/2021 | Guan et al. |
| 2021/0019338 A1 | 1/2021 | Grampurohit et al. |
| 2021/0019357 A1 | 1/2021 | Bennett et al. |
| 2021/0049143 A1* | 2/2021 | Jacinto ................. G06F 16/909 |
| 2021/0081377 A1 | 3/2021 | Polleri et al. |
| 2021/0088418 A1* | 3/2021 | Sato ..................... G01M 13/045 |
| 2021/0110288 A1 | 4/2021 | Poothiyot et al. |
| 2021/0133632 A1 | 5/2021 | Elprin et al. |
| 2021/0194783 A1 | 6/2021 | Sinha et al. |
| 2022/0019947 A1 | 1/2022 | Mitelman |

FOREIGN PATENT DOCUMENTS

| | | |
|---|---|---|
| JP | 2009-534752 A | 9/2009 |
| JP | 2017174176 A | 9/2017 |
| JP | 2021-6991 A | 1/2021 |
| WO | 2014010071 A1 | 1/2014 |
| WO | 2015030214 A1 | 3/2015 |

OTHER PUBLICATIONS

Eckerson, Wayne W., "Performance Dashboards Measuring, Monitoring, and Managing Your Business," Business Book Summaries, 2012, pp. 1-11.

Lizotte-Latendresse, Simon et al., "implementing self-service business analytics supporting lean manufacturing: A state-of-the-art. review," 16th IFAC Symposium-Incom, 2018, pp. 1143-1148.

Gröger, Christoph et al., "The Operational Process Dashboard for Manufacturing," SciVerse ScienceDirect, Procedia CIRP 7, 2013, pp. 205-210.

Yigitbasioglu, Ogan M. et al., "A review of dashboards In performance management: Implications for design and research," International Journal of Accounting Information Systems, 2012, vol. 13, pp. 41-59.

Adam, Frédéric et al., "Developing Practical Decision Support Tools Using Dashboards of Information," In: Handbook on Decision Support Systems 2. International Handbooks Information System, Springer, Berlin, Heidelberg, 2008, pp. 151-173.

Passlick, Jens et al., "A Self-Service Supporting Business Intelligence and Big Data Analytics Architecture," Proceedings of the 13th International Conference on Wirtschaftsinformatik, 2017, pp. 1126-1140.

Shneiderman, Ben, "The Eyes Have it: A Task by Data Type Taxonomy for Information Visualizations," Proc. Visual Languages, 1996, pp. 1-9.

Alpar, Paul et al., "Self-Service Business Intelligence," Business & Information Systems Engineering, 2016, vol. 58, pp. 151-155.

Kaur, Pawandeep et al., "A Review on Visualization Recommendation Strategies," In Proceedings of the 12th International Joint Conference on Computer Vision, Imaging and Computer Graphics Theory and Applications, 2017, vol. 3, pp. 266-273.

Hoang, Duong Thi Anh et al., "Dashboard by-Example: A Hypergraph-based Approach to On-demand Data warehousing systems," IEEE International Conference on Systems, Man, and Cybernetics, 2012, pp. 1853-1858.

Zhang, Shuo et al., "Ad Hoc Table Retrieval using Semantic Similarity," IW3C2, Creative Commons CC By 4.0 License, 2018, pp. 1553-1562.

Key, Alicia et al., "VizDeck: Seif-Organizing Dashboards for Visual Analytics," SIGMOD International Conference on Management of Data, 2012, pp. 681-684.

(56) References Cited

OTHER PUBLICATIONS

Mackinlay, Jock, "Automating the Design of Graphical Presentations of Relational Information," ACM Transactions on Graphics, 1986, vol. 5, No. 2, pp. 110-141.

Touma, Rizkallah et al., "Supporting Data integration Tasks with Semi-Automatic Ontology Construction," DOLAP '15: Proceedings of the ACM Eighteenth International Workshop on Data Warehousing and OLAP, 2015, pp. 89-98.

Mazumdar, Suvodeep et al., "A Knowledge Dashboard for Manufacturing Industries," ESWC 2011 Workshops, LNCS 7117, 2012, pp. 112-124.

Matera, Maristella et al., "PEUDOM: A Mashup Platform for the End User Development of Common Information Spaces," ICWE 2013, LNCS 7977, 2013, pp. 494-497.

Theorin, Alfred et al., "An Event-Driven Manufacturing information System Architecture," IFAC/IEEE Symposium on Information Control Problems in Manufacturing, 2015, pp. 1-9.

Lennerholt, Christian et al., "Implementation Challenges of Self Service Business Intelligence: A Literature Review," Proceedings of the 51st Hawaii International Conference on System Sciences, 2018, pp. 5055-5063.

Elias, Micheline et al., "Exploration Views: Understanding Dashboard Creation and Customization for Visualization Novices," INTERACT 2011, Part IV, LNCS 6949, 2011, pp. 274-291.

Buccella, Agustina et al., "Ontology-Based Data Integration Methods: A Framework for Comparison," Revista Colomblana de Computación, 2005, vol. 6, No. 1, pp. 1-24.

Roberts, Jonathan C., "State of the Art: Coordinated & Multiple Views in Exploratory Visualization," Proceedings of the 5th International Conference on Coordinated & Multiple Views in Exploratory Visualization, IEEE Computer Society Press, 2007, pp. 61-71.

Palpanas, Themis et al., "Integrated model-driven dashboard development," Information Systems Frontiers, 2007, vol. 9, pp. 1-14.

Resnick, Marc L., "Building The Executive Dashboard," Proceedings of the Human Factors and Ergonomics Society 47th Annual Meeting, 2003, pp. 1639-1643.

Sarikaya, Alper et al., "What Do We Talk About When We Talk About Dashboards?," IEEE Transactions on Visualization and Computer Graphics, 2018, pp. 1-11.

Boury-Brisset, Anne-Claire, "Ontology-based Approach for Information Fusion," Proceedings of the Sixth International Conference on information Fusion, 2003, vol. 1, pp. 522-529.

Park, Laurence A. F. et al., "A Blended Metric for Multi-label Optimisation and Evaluation," ECML/PKDD, 2018, pp. 1-16.

Kintz, Maximilien, "A Semantic Dashboard Description Language for a Process-oriented Dashboard Design Methodology," 2nd International Workshop on Mode-based Interactive Ubiquitous Systems, 2012, pp. 1-6.

Bergamaschi, Sonia et al., "A Semantic Approach to ETL Technologies," Data & Knowledge Engineering, 2011, pp. 1-24.

Office Communication for U.S. Appl. No. 16/368,390 dated Mar. 2, 2020, pp. 1-8.

International Search Report and Written Opinion for International Patent Application No. PCT/US2020/038157 dated Oct. 6, 2020, pp. 1-8.

International Search Report and Written Opinion for International Patent Application No. PCT/US2020/057780 dated Feb. 2, 2021, pp. 1-8.

Borland, David et al., "Contextual Visualization," IEEE Computer Graphics and Applications, 2018, vol. 38, No. 6, pp. 17-23.

Office Communication for U.S. Appl. No. 17/014,882 dated Apr. 27, 2021, pp. 1-27.

Anand et al., Automatic Selection of Partitioning Variables for Small Mulitiple Displays. IEEE Transactions on Visualization and Computer Graphics 22, 1 (2015), pp. 669-677.

Anonymous. 2019. Glitchart: When charts attack, https://glitch-chart.tumblr.com/. (2019). Accessed Feb. 5, 2020, pp. 1-1.

Armstrong et al., Visualizing Statistical Mix Effects and Simpson's Paradox. IEEE Transactions on Visualization and Computer Graphics 20, 12 (2014), pp. 2132-2141.

Barr et al., The Oracle Problem in Software Testing: A Survey, IEEE Transactions on Software Engineering 41, 5 (2014), pp. 507-525.

Binnig, et al. Toward Sustainable Insights, or Why Polygamy is Bad for You, In Proceedings of the Conference on Innovative Data Systems Research 2017, pp. 1-7.

Borland, et al. Contextual Visualization. IEEE Computer Graphics and Applications 38, 6 (2018), pp. 17-23.

Bresciani et al. The Risks of Visualization. Identitat und Vielfalt der Kommunikations-wissenschaft (2009), pp. 165-178.

Bresciani et al., The Pitfalls of Visual Representations: A Review and Classification of Common Errors Made While Designing and Interpreting Visualizations. Sage Open 5, 4 (2015) pp. 1-14.

Cairo, Alberto. Graphic Lies, Misleading Visuals. In New Challenges for Data Design. Springer, 2015, pp. 103-116.

Chi, Ed Huai-hsin. A Taxonomy of Visualization Techniques Using the Data State Reference Model. In IEEE Symposium on Information Visualizations 2000. INFOViS 2000. Proceedings. IEEE, 69-75.

Chiw, et al. DATm: Diderot's Automated Testing Model. In IEEE/ACM 12th International Workshop on Automation of Software Testing (AST). IEEE, 2017, pp. 45-51.

Cleveland, et al. Variables on Scatterplots Look More Highly Correlated When the Scales are Increased. Science 216, 4550 (1982), pp. 1138-1141.

Cockburn, et al. Hark No More: on the Preregistration of CHI Experiments. In Proceedings of the 2018 CHI Conference on Human Factors in Computing Systems. ACM, 2018, 141, pp. 1-12.

Correll, Michael. Ethical Dimensions of Visualization Research. In Proceedings of the 2019 CHI Conference on Human Factors In Computing Systems. ACM, 2019, 188, pp. 1-13.

Correll, et al. Truncating the Y-Axis: Threat or Menace? arXiv preprint arXiv:1907.02035 (2019), pp. 1-12.

Correll, et al. Surprise! Bayesian Weighting for De-biasing Thematic Maps. IEEE Tranactions on Visualization and Computer Graphics 23, 1 (2016), 651-660, pp. 1-10.

Correll, et al. Black Hat Visualization. In IEEE VIS; Workshop on Dealing With Cognitive Biases in Visualizations, 2017, pp. 1-4.

Correll, et al. Looks Good To Me: Visualizations As Sanity Checks. IEEE Transactions on Visualizations and Computer Graphics 25, 1 (2018), pp. 830-839.

Diehl, et al. VisGuides: A Forum for Discussing Visualization Guidelines. In Proceedings of the Eurographics/IEtE VGTC Conference on Visualization: Short Papers. Eurographics Asscociation, 2018, pp. 61-65.

D'Ignazio, et al. Feminist Data Visualization. In IEEE VIS: Workshop on Visualization for the Digital Humanities (VIS4DH), 2016, pp. 1-5.

Dimara, et al. A Task-Based Taxonomy of Cognitive Biases for Information Visualization. IEEE Transactions on Visualization and Computer Graphics (2018), pp. 1-21.

Dork, et al. Critical InfoVis: Exploring the Politics of Visualization, in 2013 ACM SIGCHI Conference on /human Factors in Computing Systems, Extended Abstracts. ACM, 2013, pp. 2189-2198.

Efron, Bradley. Bootstrap Methods: Another Look at the Jackknife. In Breakthroughs in Statistics. Springer, 1992, pp. 569-593.

Filipov, et al., CV3: Visual Exploration, Assessment, and Comparison of CVs. In Computer Graphics Forum, vol. 38, Wiley Online Library, 2019, pp. 107-118.

Ford, Brian. Write-Good: Naive Linterfor English Prose, https://github.com/btford/write-good Accessed: Feb. 6, 2020, pp. 1-6.

Gelman, et al. The Garden of Forking Paths: Why Multiple Comparisons Can Be a Problem, Even When There is No "Fishing Expedition" or "P-Hacking" and the Research Hypothesis was Posited Ahead of Time. Department of Statistics, Columbia University (2013), pp. 1-27.

World Bank Group. World Development Indicators, http://datatopics.worldbank.org/world-development-indicators/. (2020), pp. 1-6.

Haraway, Donna. Situated Knowledges: The Science Question in Feminism and the Privilege of Partial Perspective. Feminist Studies 14, 3 (1988), pp. 575-599.

Heer, Jeffrey. Agency Plus Automation: Designing Artificial Intelligence into Interactive Systems. Proceedings of the National Academy of Sciences 116, 6, (2019), pp. 1844-1850.

(56) References Cited

OTHER PUBLICATIONS

Heer, Jeffrey. Visualization is Not Enough, https://homes.cs.washington.edu/~jheer/talks/LuroVis2019-Capstone.pdf EuroVis Capstone, 2019, pp. 1-113.

Heer, et al. Multi-Scale Banking to 45 Degrees. IEEE Transactions on Visualization and Computer Graphics 12, 5 (2006), pp. 701-708.

Hibbard, et al. A Lattice Model for Data Display. In Proceedings of the Conference on Visualization. IEEE Computer Society Press, 1994, pp. 310-317.

Hofmann, et al. Graphical Tests for Power Comparison of Competing Designs. IEEE Transactions on Visualization and Computer Graphics 18, 12 (2012), pp. 2441-2448.

Huff, Darrell. 1993. How To Lie With Statistics. WW Norton & Company, pp. 1-141.

Hullman et al. Visualization Rhetoric: Framing Effects in Narrative Visualization. IEEE Transaction on Visualization and Computer Graphics 17, 12 (2011), pp. 2231-2240.

Isenberg, et al. A Systematic Review on the Practice of Evaluating Visualization. IEEE Transactions on Visualization and Computer Graphics 19, 12 (2013), pp. 2818-2827.

Jannah, Hassan M. MetaReader: A Dataset Meta-Exploration and Documentation tool. (2014), pp. 1-11.

Johnson, Stephen C. 1977. Lint, a C Program Checker, Citeseer, pp. 1-12.

Kandel, et al. Research Directions in Data Wrangling: Visualizations and Transformations for Usable and Credible Data. Information Visualization 10, 4 (2011), pp. 271-288.

Kandel, et al. Profiler: Integrated Statistical Analysis and Visualization for Data Quality Assessment. In Proceedings of the International Working Conference on Advanced Visual Interfaces. ACM, 2012, pp. 547-554.

Kim, et al. A taxonomy of Dirty Data. Data Mining and Knowledge Discovery 7, 1 (2003), pp. 81-89.

Kindlmann, et al. Algebraic Visualization Design for Pedagogy. IEEE VIS: Workshop on Pedagogy of Data Visualization. (2016), pp. 1-5.

Kong, et al. Frames and Slants in Titles of Visualizations on Controversial Topics. In Proceedings of the 2018 CHI Conference on Human Factors in Computing Systems. ACM, 2018, pp. 1-12.

Kong, et al. Trust and Recall of Information Across Varying Degrees of Title—Visualization Misalignment. In Proceedings of the 2019 CHI Conference on Human Factors In Computing Systems. ACM, 2019, 346, pp. 1-11.

Amperser Labs. Proselit: A linterfor prose, http://proselint.com/. Accessed: Feb. 10, 2020, pp. 1-3.

Lavigne, et al. Predicting Financial Crime: Augmenting the Predictive Policing Arsenal. arXiv preprint arXiv: 1704.07826 (2017), pp. 1-8.

Ziemkiewicz, et al., tmbedding Information Visualization within Visual Representation, In Advances in Information and Intelligent Systems. Springer, 2009, pp. 307-326.

Zhou, et al. Metamorphic Testing of Driverless Cars. Commun. ACM 62, 3 (Mar. 2019), pp. 61-67.

Zhao, et al. Controlling False Discoveries During Interactive Data Exploration. In proceedings of the 2017 International Conference on Management of Data. ACM, 2016, pp. 527-540.

Lundgard, et al. Sociotechnical Considerations for Accessible Visualization Design. IEEE Transactions on Visualization and Computer Graphics (2019), pp. 1-5.

Lunzer, et al. 2014. It Ain't Necessarily So: Checking Charts for Robustness. IEEE VisWeek Poster proceedings (2014), pp. 1-3.

Giorgia Lupi. 2017. Data Humanism: the Revolutionary Future of Data Visualization. Print Magazine 30 (2017), pp. 1-10.

MacKinlay, Jock. Automating the Design of Graphical Presentations of Relational Information. ACM Transactions on Graphics (Tog) 5, 2 (1986), pp. 110-141.

MacKinlay, et al. Show Me: Automatic Presentation for Visual analysis, IEEE Transactions on Visualization and Computer Graphics 13, 6 (2007), pp. 1137-1144.

Matejka, et al. Same Stats, Different Graphs: Generating Datasets with Varied Appearance and Identical Statistics Through Simulated Annealing. In Proceedings of the 2017 CHI Conference on Human Factors in Computing Systems. ACM, 2017, pp. 1290-1294.

Mayorga, et al. Splatterplots: Overcoming Overdraw in Scatter Plots. IEEE Transactions on Visualization and Computer Graphics 19, 9 (2013), pp. 1526-1538.

Mayr, et al. Trust in Information Visualization. In EuroVis Workshop on Trustworthy Visualization (TrustVis), Robert Kosara, Kai Lawonn, Lars Linsenm, and Noeska Smit (Eds.). The Eurographics Association, 2019, pp. 1-6.

Micallef, et al. Towards Perceptual Optimization of the Visual Design of Scatterplots. IEEE Transactions on Visualization and Computer Graphics 23, 6 (2017), pp. 1588-1599.

Andrew Vande Moere. 2007. Towards Designing Persuasive Ambient Visualization. In issues in the Design & Evaluation of Ambient information Systems Workshop. Citeseer, pp. 48-52.

Moritz, et al. Formalizing Visualization Design Knowledge as Constraints: Actionable and Extensible Models in Draco. IEEE Transactions on Visualization and Computer Graphics 25, 1 (2018), pp. 438-448.

Newman, et al. Bar Graphs Depicting Averages are Perceptually Misinterpreted: the Within-the-Bar Bias. Psychonomic Bulletin & Review 19, 4 (2012), pp. 601-607.

Onuoha, Mimi. On Missing Data Sets. https://github.com/rnimionuohaimissing-datasets. Accessed: Feb. 10, 2020, pp. 1-3.

Pandey, et al. How Deceptive are Deceptive Visualizations?: an Empirical Analysis of Common Distortion Techniques. In Proceedings of the 33rd Annual ACM Conference on Human Factors in Ciomputing Systems. ACM, 2015, pp. 1469-1478.

Pirolli, et al. The Sensemaking Process and Leverage Points for Analyst Technology as Identified Through Cognitive Task Analysis, in Proceedings of International Conference on Intelligence Analysis., vol. 5, McLean, VA, USA, 2005, pp. 1-6.

Plaisant, Catherine. Information Visualization and the Challenge of Universal Usability. In Exploring geovisualization, Elsevier, 2005, pp. 53-82.

Pu, et al. The Garden of Forking Paths in Visualization: a Design Space for Reliable Exploratory Visual Analyics: Position Paper. In IEEE VIS: Evaluation and Beyond-Methodological Approaches for Visualization (BELIV). IEEE, 2018, pp. 37-45.

Qu, et al. Keeping Multiple Views Consistent: Constraints, Validations, and Exceptions in Visualization Authoring. IEEE Transactions on Visualization and Computer Graphics 24, 1 (2017), pp. 468-477.

Raman, et al, Potter's Wheel: an Interactive Data Cleaning System. In International Conference on Very Large Data Bases, vol. 1, 2001, pp. 381-390.

Redmond, Stephen. Visual Cues in Estimation of Part-to-Whole Comparisons. IEEE Transactions on Visualization and Computer Graphics (2019), pp. 1-6.

Ritchie, et al. A Lie Reveals the Truth: Quasimodes for Task-Aligned Data Presentation. In Proceedings of the 2019 CHI Conference on human Factors in Computing Systems. ACM, 193, 2019, pp. 1-11.

Rogowitz, et al. The "Which Blair Project": a Quick Visual Method for Evaluating Perceptual Color Maps. In IEEE Visualization 2001, Proceedings. 2001, pp. 183-190.

Rogowitz, et al. How Not to Lie with Visualization. Computers in Physics 10, 3, (1996), pp. 268-273.

Rosling, et al. Health Advocacy with Gapminder Animated Statistics. Journal of Epidemiology and Global Health 1, 1 (2011), pp. 11-14.

Sacha, et al. The Role of Uncertainty, Awareness, and Trust in Visual Analytics, IEEE Transactions on Visualization and Computer Graphics 22, 1 (2016), pp. 240-249.

Satyanarayan, et al. 2016. Vega-Lite: A Grammar of Interactive Graphics. IEEE Transactions on Visualization and Computer Graphics 23, 1 (2016), pp. 341-350.

Segura, et al. A Survey on Metamorphic Testing. IEEE Transactions on Software Engineering 42, 9 (2016), pp. 805-824.

(56) References Cited

OTHER PUBLICATIONS

Song, et al. Where's My Data? Evaluating Visualizations with Missing Data. IEEE Transactions on Visualization and Computer Graphics 25, 1 (2018), pp. 914-924.
Srinivasan, et al. Augmenting Visualizations with Interactive Data Facts to Facilitate Interpretation and Communication. IEEE Transactions on Visualization and Computer Graphics 25, 1 (2018), pp. 672-681.
Stonebraker, et al. Data Curation at Scale: the Data Tamer System. In Proceedings of the Conference on Innovative Data Systems Research, 2013, pp. 1-10.
Szafir, Danielle Albers. The Good, the Bad, and the Biased: Five Ways Visualizations Can Mislead (and How to Fix Them). ACM Interactions 25, 4 (2018), pp. 26-33.
Tableau. Tableau Prep. https://www.tableau.com.products/prep, 2020, pp. 1-13.
Trifacta. Trifacta. https://www.trifacta.com/. 2020, pp. 1-8.
Trulia. New York Real Estate Market Overview. https://www.trulia.com/real_estatelNew_York-New_York/. 2020, Accessed: Feb. 11, 2020, pp. 1-3.
Valdez, et al. A Framework for Studying Biases in Visualization Research. (2017), pp. 1-5.
Van Wijk, Jarke J. The Value of Visualization. In VIS 05. IEEE Visualization, 2005. IEEE, pp. 79-86.
VanderPlas, et al. 2018. Altair: Interactive Statistical Visualizations for Python. J. Open Source Software 3, 32 (2018), pp. 1-2.
Veras, et al. Discriminability Tests for Visualization Effectiveness and Scalability. IEEE Transactions on Visualization and Computer Graphics (2019), pp. 1-10.
Vickers, et al. Understanding Visualization: a Formal Foundation Using Category Theory and Semiotics. IEEE Transactions on Visualization and Computer Graphics 19, 6 (2012), pp. 1048-1061.
Wainer, Howard. How to Display Data Badly. The American Statistician 38, 2 (1984), pp. 1-12.
Wang, et al. Uni-Detect: A Unified Approach to Automated Error Detection in Tables. In Proceedings of the 2019 International Conference on Management of Data. ACM, 2019, pp. 811-828.
Whitworth, Brian. Polite Computing. Behaviour & Information Technology 24, 5 (2005), pp. 353-363.
Wood, et al. Design Exposition with Literate Visualization. IEEE Transactions on Visualization and Computer Graphics 25, 1 (2018), pp. 759-768.
Wu, et al. Scorpion: Explaining Away Outliers in Aggregate Queries. Proceedings of the VLDB Endowment 6, 8 (2013), pp. 553-564.
Xiong, et al. Illusion of Casuality in Visualized Data. arXiv preprint arXiv:1908.00215 (2019), pp. 1-10.
Xiong, et al. The Curse of Knowledge in Visual Data Communication. IEEE Tranactions on Visualization and Computer Graphics (2019), pp. 1-12.
Zgraggen, et al. Investigating the Effect of the Multiple Comparisons Problem in Visual Analysis. In Proceedings of the 2018 CHI Conference on Human Factors in Computing Systems, ACM, 2018, pp. 1-12.
Barowy, et al., "ExceLint: Automatically Finding Spreadsheet Formula Errors." Proc ACM Program. Lang. 2, OOPSLA, Article 148 (Nov. 2018), pp. 1-26.
Barowy, et al., "CheckCell: Data Debugging for Spreadsheets." ACM SIGPLAN Notices 49, 10 (2014), pp. 507-523.
Donaldson, et al., "Automated Testing of Graphics Shader Compilers." Proceedings of the ACM Programming Languages 1, OOPSLA, Article 93 (Oct. 2017), pp. 1-29.
Dragicevic, et al., "Increasing the Transparency of Research Papers with Explorable Multiverse Analyses." In Proceedings of the 2019 CHI Conference on Human Factors in Computing Systems, ACM, May 2019, Glasgow, United Kingdom, pp. 1-16.
Gotz, et al., "Visualization Model Validation via Inline Replication." information Visualization (2019), pp. 405-425.
Guderlei, et al., "Statistical Metamorphic Testing Testing Programs With Random OutPut by Means of Statistical Hypothesis Tests and Metaphoric Testing." In Seventh International Conference on Quality Software. IEEE, pp. 404-409, 2007.
Guo, et al., "What You See is Not What You Get!: Detecting Simpson's Paradoxes During Data Exploration." In ACM SIGMOD Workshop on Human-in-the-Loop Data Analytics (HILDA). ACM, 2, 2017, pp. 1-5.
Hynes, et al., "The Data Linter: Lightweight, Automated Sanity Checking for ML Data Sets." In NIPS: Workshop on Systems for ML and Open Source Software. pp. 1-7, 2017.
Kindlmann, et al., "An Algebraic Process for Visualization Design." IEEE Transactions on Visualization and Computer Graphics 20, 12 (Dec. 2014), pp. 2181-2191.
Kirby, et al., "The Need for Verifiable Visualizations." IEEE Computer Graphics and Applications 28, 5 (2008), pp. 78-83.
McNutt, et al., "Linting for Visualization: Towards a Practical Automated Visualization Guidance System." In VisGuides: 2nd Workshop on the Creation, Curation, Critique and Conditioning of Principles and Guidelines in Visualization, pp. 1-14, 2018.
Musiu, et al., "Preventing data errors with continuous testing." In Proceedings of the 2015 international Symposium on Software Testing and Analysis. ACM, pp. 373-384, 2015.
Salimi, et al., "Bias in OLAP Queries: Detection, Explanation, and Removal." in Proceedings of the 2018 international Conference on Management of Data. ACM, pp. 1021-1035, 2018.
Tang, et al., "Towards Democratizing Relational Data Visualization." In Proceedings of the 2019 International Conference on Management of Data. ACM, pp. 2025-2030, 2019.
Wall, et al., "Warning, Bias May Occur: A Proposed Approach to Detecting Cognitive Bias in Interactive Visual Analytics." In 2017 IEEE Conference on Visual Analytics Science and Technology (VAST). IEEE, pp. 104-115, 2017.
Wickham, et al., "Graphical inference for infovis." IEEE Transactions on Visualization and Computer Graphics 16, 6 (Nov./Dec. 2010), pp. 973-979.
Diehl, et al. VisGuides: A Forum for Discussing Visualization Guidelines. In Proceedings of the Eurographics/IEEE VGTC Conference on Visualization: Short Papers. Eurographics Asscociation, 2018, pp. 61-65.
International Search Report and Written Opinion for International Patent Application No. PCT/US2020/050722 dated Nov. 24, 2020, pp. 1-6.
Arai, Taichi et al., "Preventing the creation of misleading graphs, Targeted learning tool," IPSJ SIG Technical Report [online], Mar. 12, 2018, vol. 2018-GN-104 No. 4, ISSN 2188-8744, pp. 1-17.
Office Communication for U.S. Appl. No. 16/915,963 dated Jul. 19, 2021, pp. 1-9.
International Search Report and Written Opinion for International Patent Application No. PCT/US2021/049229 dated Nov. 16, 2021, pp. 1-8.
Office Communication for U.S. Appl. No. 16/944,064 dated Nov. 26, 2021, pp. 1-50.
Office Communication for U.S. Appl. No. 16/915,963 dated Jan. 5, 2022, pp. 1-32.
Office Communication for U.S. Appl. No. 16/915,963 dated Jan. 7, 2022, pp. 1-9.
Office Communication for U.S. Appl. No. 17/014,882 dated Jan. 25, 2022, pp. 1-6.
Wu, Aoyu et al., "MultiVision: Designing Analytical Dashboards with Deep Learning Based Recommendation," IEEE, arXiv preprint, arXiv:2107.07823, Jul. 2021, pp. 1-11.
Shi, Danqing et al., "Talk2Data: High-Level Question Decomposition for Data-Oriented Question and Answering," arXiv preprint, arXiv:2107.14420, Jul. 2021, pp. 1-11.
Wang, Yun et al., "DataShot: Automatic Generation of Fact Sheets from Tabular Data," IEEE Transactions on Visualization and Computer Graphics, vol. 26, No. 1, Aug. 2019, pp. 1-11.
Wang Baldonado, Michelle Q. et al., "Guidelines for Using Multiple Views in Information Visualization," AVI '00, In Proceedings of the Working Conference on Advanced Visual Interfaces, May 2000, pp. 1-10.
Chen, Xi et al., "Composition and Configuration Patterns in Multiple-View Visualizations," arXiv preprint, arXiv:2007.15407, Aug. 2020, pp. 1-11.

(56) References Cited

OTHER PUBLICATIONS

Crisan, Anamaria et al., "GEViTRec: Data Reconnaissance Through Recommendation Using a Domain-Specific Visualization Prevalence Design Space," IEEE Transactions on Visualization and Computer Graphics, TVCG Submission, Jul. 2021, pp. 1-18.
Office Communication for U.S. Appl. No. 16/944,085 dated Mar. 17, 2022, pp. 1-6.
Office Communication for U.S. Appl. No. 16/903,967 dated Mar. 18, 2022, pp. 1-11.
Office Communication for U.S. Appl. No. 16/944,064 dated Mar. 22, 2022, pp. 1-10.
Office Communication for U.S. Appl. No. 16/915,963 dated Mar. 23, 2022, pp. 1-4.
International Search Report and Written Opinion for International Patent Application No. PCT/US2022/012907 dated Mar. 16, 2022, pp. 1-13.
Office Communication for U.S. Appl. No. 16/915,963 dated Apr. 26, 2022, pp. 1-9.
Office Communication for U.S. Appl. No. 16/672,130 dated May 19, 2022, pp. 1-33.
Office Communication for U.S. Appl. No. 17/014,882 dated Jun. 9, 2022, pp. 1-8.
Office Communication for U.S. Appl. No. 17/158,911 dated Jun. 28, 2022, pp. 1-29.
Office Communication for U.S. Appl. No. 16/672,130 dated Aug. 2, 2022, pp. 1-5.
Office Communication for U.S. Appl. No. 16/944,085 dated Aug. 30, 2022, pp. 1-9.
Office Communication for U.S. Appl. No. 16/944,085 dated Sep. 9, 2022, pp. 1-2.
Office Communication for U.S. Appl. No. 16/672,130 dated Sep. 13, 2022, pp. 1-35.
Office Communication for U.S. Appl. No. 16/903,967 dated Sep. 27, 2021, pp. 1-16.
Office Communication for U.S. Appl. No. 17/014,882 dated Nov. 2, 2021, pp. 1-33.
International Search Report and Written Opinion for International Patent Application No. PCT/US2021/043167 dated Oct. 26, 2021, pp. 1-7.
International Search Report and Written Opinion for International Patent Application No. PCT/US2021/043177 dated Oct. 26, 2021, pp. 1-8.
Office Communication for U.S. Appl. No. 17/014,882 dated Sep. 28, 2022, pp. 1-11.
Office Communication for U.S. Appl. No. 16/915,963 dated Oct. 5, 2022, pp. 1-7.
Office Communication for U.S. Appl. No. 17/158,911 dated Dec. 23, 2022, pp. 1-37.
Office Communication for U.S. Appl. No. 16/672,130 dated Feb. 13, 2023, pp. 1-34.
Office Communication for U.S. Appl. No. 17/866,091 dated Mar. 2, 2023, pp. 1-30.

* cited by examiner

SURFACING VISUALIZATION MIRAGES

CROSS-REFERENCE TO RELATED APPLICATION

This application is a Utility patent application based on previously filed U.S. Provisional Patent Application No. 62/902,273 filed on Sep. 18, 2019, the benefit of the filing date of which is hereby claimed under 35 U.S.C. § 119(e) and which is further incorporated in entirety by reference.

TECHNICAL FIELD

The present invention relates generally to data visualization, and more particularly, but not exclusively to, automatically identifying visualizations that may be misleading.

BACKGROUND

Organizations are generating and collecting an ever increasing amount of data. This data may be associated with disparate parts of the organization, such as, consumer activity, manufacturing activity, customer service, server logs, or the like. For various reasons, it may be inconvenient for such organizations to effectively utilize their vast collections of data. In some cases the quantity of data may make it difficult to effectively utilize the collected data to improve business practices. In some cases, organizations employ various tools to generate visualizations of the some or all of their data. Employing visualizations to represent this data may enable organizations to improve their understanding of critical business operations and help them monitor key performance indicators. However, in some cases, visualizations may include mirages that may mislead viewers or authors of the visualizations even to the visualizations may appear to be normal. In some cases, determining the source or otherwise analyzing the existence, source or cause of such mirages may require an inordinate level of understanding of the underlying data that was used to generate the visualizations. Disadvantageously, this may require organizations to direct skilled or specialized data analysts to review the visualization and data help identify mirages that may cause a visualization to be misleading to audiences. Also, in some cases, even if a user has the skills or technical background to perform their own mirage analysis, the underlying data may be inaccessible to users that may be reviewing or validating the visualizations. Thus, it is with respect to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of Various Embodiments, which is to be read in association with the accompanying drawings, wherein.

DETAILED DESCRIPTION OF VARIOUS EMBODIMENTS

Figure 1:
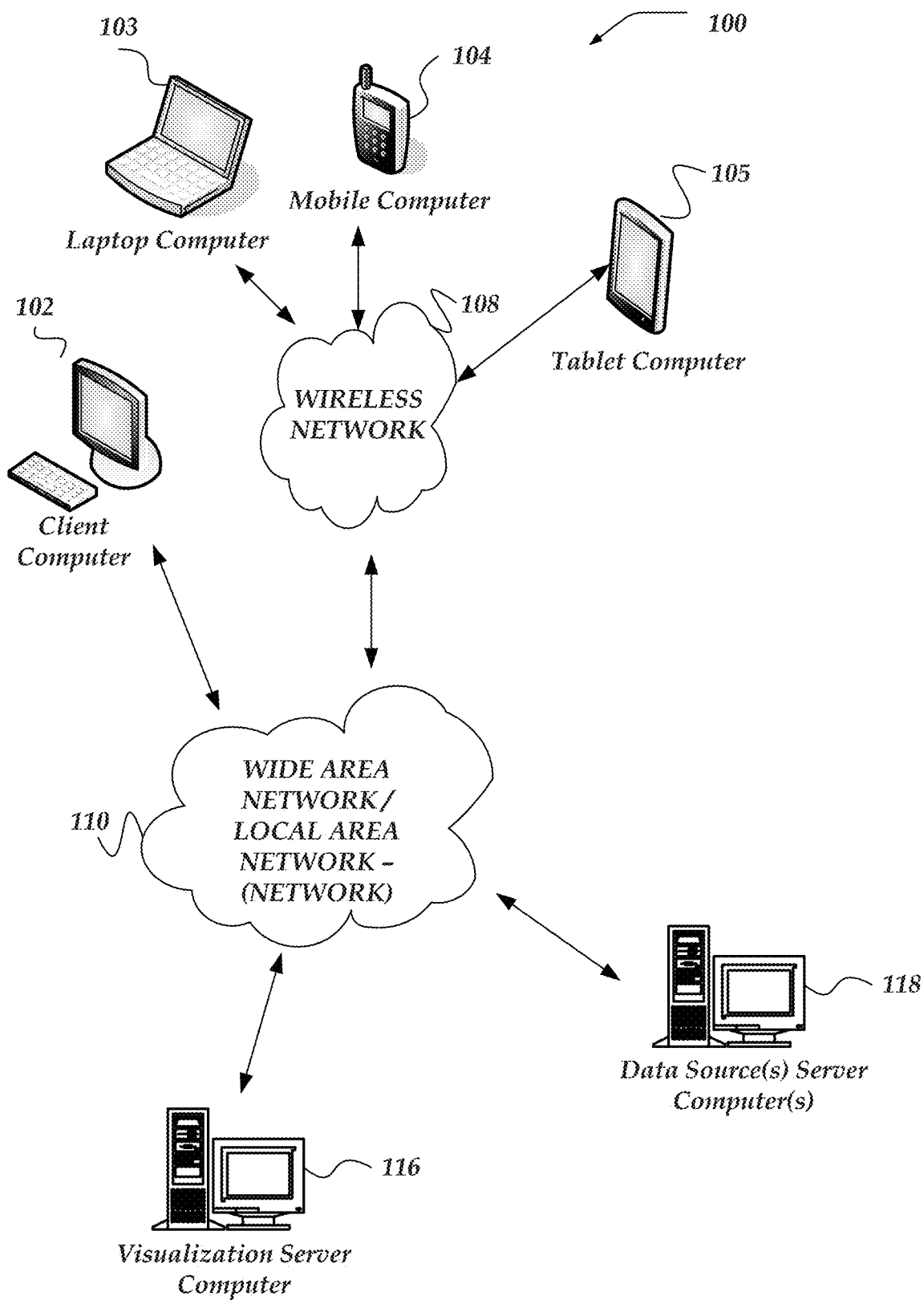
FIG. 1 illustrates a system environment in which various embodiments may be implemented.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on"

is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

As used herein the term, "engine" refers to logic embodied in hardware or software instructions, which can be written in a programming language, such as C, C++, Objective-C, COBOL, Java™, PHP, Perl, JavaScript, Ruby, VBScript, Microsoft .NET™ languages such as C#, or the like. An engine may be compiled into executable programs or written in interpreted programming languages. Software engines may be callable from other engines or from themselves. Engines described herein refer to one or more logical modules that can be merged with other engines or applications, or can be divided into sub-engines. The engines can be stored in non-transitory computer-readable medium or computer storage device and be stored on and executed by one or more general purpose computers, thus creating a special purpose computer configured to provide the engine.

As used herein, the term "data source" refers to databases, applications, services, file systems, or the like, that store or provide information for an organization. Examples of data sources may include, RDBMS databases, graph databases, spreadsheets, file systems, document management systems, local or remote data streams, or the like. In some cases, data sources are organized around one or more tables or table-like structure. In other cases, data sources be organized as a graph or graph-like structure.

As used herein the term "data model" refers to one or more data structures that provide a representation of one or more portions of an underlying data source. In some cases, data models may provide views of a data source for particular applications. Data models may be considered views or interfaces to underlying data sources. In some cases, data models may map directly to a data source (e.g., practically a logical pass through). Also, in some cases, data models may be provided by a data source. Data models enable organizations to organize or present information from data sources in ways that may be more convenient, more meaningful (e.g, easier to reason about), safer, or the like.

As used herein the term "data object" refers to one or more data structures that comprise data models. In some cases, data objects may be considered portions of the data model. Data objects may represent individual instances of items or classes or kinds of items.

As used herein the term "panel" refers to region within a graphical user interface (GUI) that has a defined geometry (e.g., x, y, z-order) within the GUI. Panels may be arranged to display information to users or to host one or more interactive controls. The geometry or styles associated with panels may be defined using configuration information, including dynamic rules. Also, in some cases, users may be enabled to perform actions on one or more panels, such as, moving, showing, hiding, re-sizing, re-ordering, or the like.

As user herein the "visualization model" refers to one or more data structures that represent one or more representations of a data model that may be suitable for use in a visualization that is displayed on one or more hardware displays. Visualization models may define styling or user interface features that may be made available to non-authoring user.

As used herein the term "display object" refers to one or more data structures that comprise visualization models. In some cases, display objects may be considered portions of the visualization model. Display objects may represent individual instances of items or entire classes or kinds of items that may be displayed in a visualization. In some embodiments, display objects may be considered or referred to as views because they provide a view of some portion of the data model.

As used herein the terms "visualization mirage," or "mirage" refer to visually misleading presentations of the data in visualizations. Further, a visualization mirage may be any visualization where the cursory reading of the visualization would appear to support a particular message arising from the data, but where a closer re-examination of the visualization, backing data, or analytical process may invalidate or cast significant doubt on this support.

As used herein the term "configuration information" refers to information that may include rule based policies, pattern matching, scripts (e.g., computer readable instructions), or the like, that may be provided from various sources, including, configuration files, databases, user input, built-in defaults, or the like, or combination thereof.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed to managing visualizations of data using one or more processors that execute one or more instructions to perform as described herein. In one or more of the various embodiments, one or more visualizations based on data from a data source may be provided.

In one or more of the various embodiments, one or more assessment models based on the one or more visualizations may be provided such that the one or more assessment models may be arranged to detect one or more mirages in the one or more visualizations, and such that the one or more mirages may be visually misleading presentations of the data in the one or more visualizations.

In one or more of the various embodiments, the one or more assessment models may be employed to determine one or more assessment results based on the one or more visualizations and the data from the data source such that each assessment result includes an assessment score that corresponds to a detection of the one or more mirages.

In one or more of the various embodiments, employing the one or more assessment models to determine the one or more assessment results may include: generating one or more test visualizations based on the one or more visualizations such that each test visualization is modified based on the one or more assessment models; comparing differences of the one or more test visualizations to the one or more visualizations; and determining the probability score that corresponds to detection of the one or more mirages based on the comparison such that the value of the probability is proportional to the magnitude of the compared differences.

In one or more of the various embodiments, employing the one or more assessment models to determine the one or more assessment results may include, evaluating the data associated with the one or more visualizations to determine one or more of missing or repeated records, spelling mistakes, drill-down bias, differing number of records by group, or misleading data selection.

In one or more of the various embodiments, employing the one or more assessment models to determine the one or more assessment results may include, evaluating the one or more visualizations to determine one or more types of mirages, including one or more of non-sequitur visualizations, over-plotting, concealed uncertainty, or manipulation of scales.

In one or more of the various embodiments, employing the one or more assessment models to determine the one or more assessment results may include: evaluating data associated with the one or more visualizations that may be included in the data source and omitted from the one or more visualization; and generating a portion of the one or more assessment results based on the evaluation.

In one or more of the various embodiments, the one or more assessment results may be rank ordered based on the assessment score.

In one or more of the various embodiments, a report may be provided that includes the rank ordered list of the one or more assessment results. In one or more of the various embodiments, providing the report may include generating one or more other visualizations that may be associated with one or more of the one or more assessment models, the one or more assessment results, or the one or more mirages.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)-(network) 110, wireless network 108, client computers 102-105, visualization server computer 116, data source server computer 118, or the like.

At least one embodiment of client computers 102-105 is described in more detail below in conjunction with FIG. 2. In one embodiment, at least some of client computers 102-105 may operate over one or more wired or wireless networks, such as networks 108, or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to send requests and receive responses over the web. The browser application may be configured to receive and display graphics, text, multimedia, and the like, employing virtually any web-based language. In one embodiment, the browser application is enabled to employ JavaScript, HyperText Markup Language (HTML), eXtensible Markup Language (XML), JavaScript Object Notation (JSON), Cascading Style Sheets (CS S), or the like, or combination thereof, to display and send a message. In one embodiment, a user of the client computer may employ the browser application to perform various activities over a network (online). However, another application may also be used to perform various online activities.

Client computers 102-105 also may include at least one other client application that is configured to receive or send content between another computer. The client application may include a capability to send or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), a client certificate, or other device identifier. Such information may be provided in one or more network packets, or the like, sent between other client computers, visualization server computer 116, data source server computer 118, or other computers.

Client computers 102-105 may further be configured to include a client application that enables an end-user to log into an end-user account that may be managed by another computer, such as visualization server computer 116, data source server computer 118, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like. Also, client computers may be arranged to enable users to display reports, interactive user-interfaces, or results provided by visualization server computer 116, data source server computer 118.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, visualization server computer 116, data source server computer 118, client computers 102, and client computers 103-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, Ethernet port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information non-transitory delivery media or transitory delivery media. By way of example, communication media includes wired media such as twisted pair, coaxial cable, fiber optics, wave guides, and other wired media and wireless media such as acoustic, RF, infrared, and other wireless media.

Also, one embodiment of visualization server computer 116, data source server computer 118 are described in more detail below in conjunction with FIG. 3. Although FIG. 1 illustrates visualization server computer 116, data source server computer 118, or the like, each as a single computer, the innovations or embodiments are not so limited. For example, one or more functions of visualization server computer 116, data source server computer 118, or the like, may be distributed across one or more distinct network computers. Moreover, in one or more embodiments, visualization server computer 116, data source server computer 118 may be implemented using a plurality of network computers. Further, in one or more of the various embodiments, visualization server computer 116, data source server computer 118, or the like, may be implemented using one or more cloud instances in one or more cloud networks. Accordingly, these innovations and embodiments are not to be construed as being limited to a single environment, and other configurations, and other architectures are also envisaged.

Illustrative Client Computer

Figure 2:
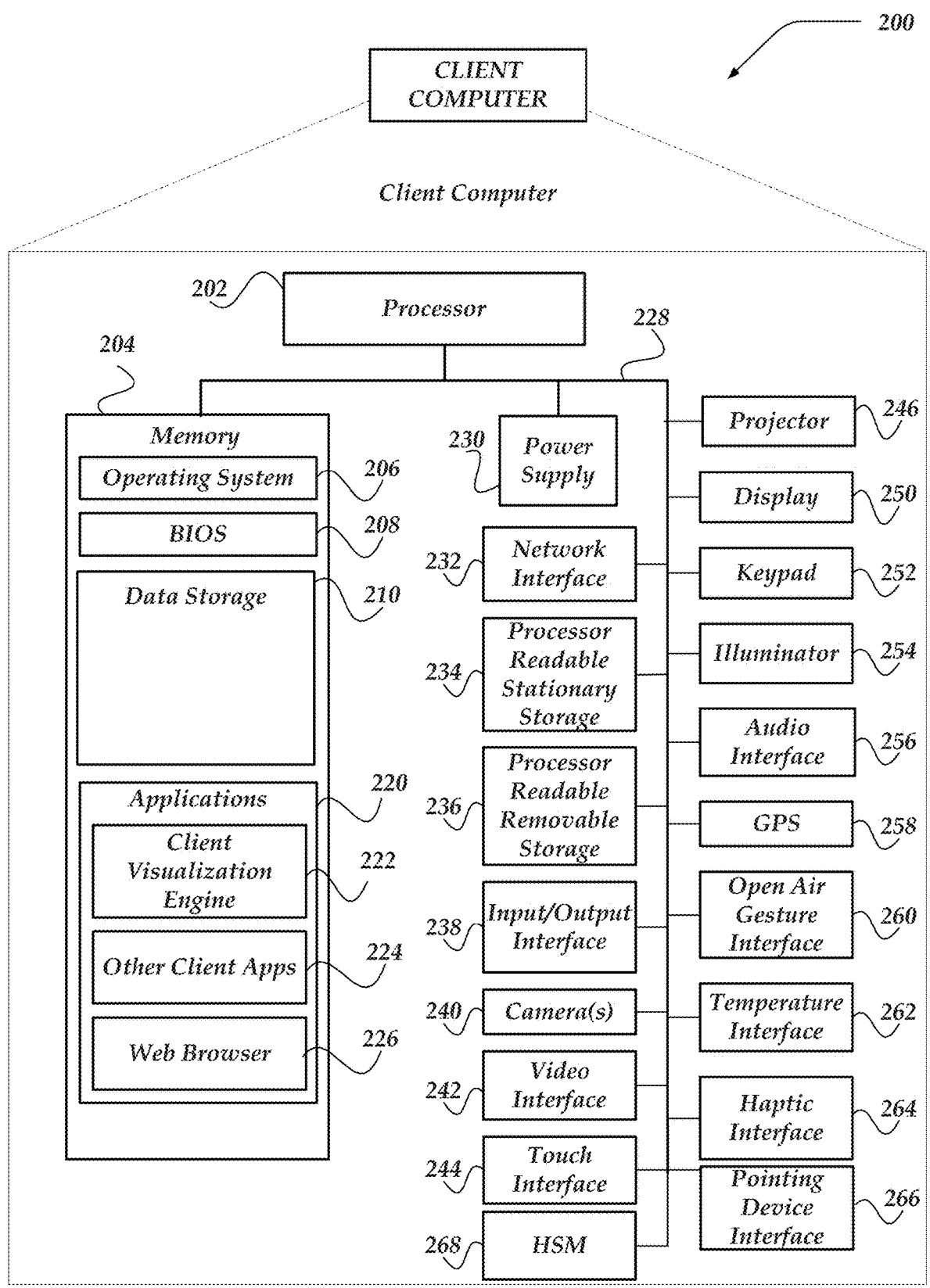
FIG. 2 illustrates a schematic embodiment of a client computer.

FIG. 2 shows one embodiment of client computer 200 that may include many more or less components than those shown. Client computer 200 may represent, for example, one or more embodiment of mobile computers or client computers shown in FIG. 1.

Client computer 200 may include processor 202 in communication with memory 204 via bus 228. Client computer 200 may also include power supply 230, network interface 232, audio interface 256, display 250, keypad 252, illuminator 254, video interface 242, input/output interface 238, haptic interface 264, global positioning systems (GPS) receiver 258, open air gesture interface 260, temperature interface 262, camera(s) 240, projector 246, pointing device interface 266, processor-readable stationary storage device 234, and processor-readable removable storage device 236. Client computer 200 may optionally communicate with a base station (not shown), or directly with another computer. And in one embodiment, although not shown, a gyroscope may be employed within client computer 200 to measuring or maintaining an orientation of client computer 200.

Power supply 230 may provide power to client computer 200. A rechargeable or non-rechargeable battery may be used to provide power. The power may also be provided by an external power source, such as an AC adapter or a powered docking cradle that supplements or recharges the battery.

Network interface 232 includes circuitry for coupling client computer 200 to one or more networks, and is constructed for use with one or more communication protocols and technologies including, but not limited to, protocols and technologies that implement any portion of the OSI model for mobile communication (GSM), CDMA, time division multiple access (TDMA), UDP, TCP/IP, SMS, MMS, GPRS, WAP, UWB, WiMax, SIP/RTP, GPRS, EDGE, WCDMA, LTE, UMTS, OFDM, CDMA2000, EV-DO, HSDPA, or any of a variety of other wireless communication protocols. Network interface 232 is sometimes known as a transceiver, transceiving device, or network interface card (MC).

Audio interface 256 may be arranged to produce and receive audio signals such as the sound of a human voice. For example, audio interface 256 may be coupled to a speaker and microphone (not shown) to enable telecommunication with others or generate an audio acknowledgment for some action. A microphone in audio interface 256 can also be used for input to or control of client computer 200, e.g., using voice recognition, detecting touch based on sound, and the like.

Display 250 may be a liquid crystal display (LCD), gas plasma, electronic ink, light emitting diode (LED), Organic LED (OLED) or any other type of light reflective or light transmissive display that can be used with a computer. Display 250 may also include a touch interface 244 arranged to receive input from an object such as a stylus or a digit from a human hand, and may use resistive, capacitive, surface acoustic wave (SAW), infrared, radar, or other technologies to sense touch or gestures.

Projector 246 may be a remote handheld projector or an integrated projector that is capable of projecting an image on a remote wall or any other reflective object such as a remote screen.

Video interface 242 may be arranged to capture video images, such as a still photo, a video segment, an infrared video, or the like. For example, video interface 242 may be coupled to a digital video camera, a web-camera, or the like. Video interface 242 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 252 may comprise any input device arranged to receive input from a user. For example, keypad 252 may include a push button numeric dial, or a keyboard. Keypad 252 may also include command buttons that are associated with selecting and sending images.

Illuminator 254 may provide a status indication or provide light. Illuminator 254 may remain active for specific periods of time or in response to event messages. For example, when illuminator 254 is active, it may back-light the buttons on keypad 252 and stay on while the client computer is powered. Also, illuminator 254 may back-light these buttons in various patterns when particular actions are performed, such as dialing another client computer. Illuminator 254 may also cause light sources positioned within a transparent or translucent case of the client computer to illuminate in response to actions.

Further, client computer 200 may also comprise hardware security module (HSM) 268 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 268 may be a stand-alone computer, in other cases, HSM 268 may be arranged as a hardware card that may be added to a client computer.

Client computer 200 may also comprise input/output interface 238 for communicating with external peripheral devices or other computers such as other client computers and network computers. The peripheral devices may include an audio headset, virtual reality headsets, display screen glasses, remote speaker system, remote speaker and microphone system, and the like. Input/output interface 238 can utilize one or more technologies, such as Universal Serial Bus (USB), Infrared, WiFi, WiMax, Bluetooth™, and the like.

Input/output interface 238 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to client computer 200.

Haptic interface 264 may be arranged to provide tactile feedback to a user of the client computer. For example, the haptic interface 264 may be employed to vibrate client computer 200 in a particular way when another user of a computer is calling. Temperature interface 262 may be used to provide a temperature measurement input or a temperature changing output to a user of client computer 200. Open air gesture interface 260 may sense physical gestures of a user of client computer 200, for example, by using single or stereo video cameras, radar, a gyroscopic sensor inside a computer held or worn by the user, or the like. Camera 240 may be used to track physical eye movements of a user of client computer 200.

GPS transceiver 258 can determine the physical coordinates of client computer 200 on the surface of the Earth, which typically outputs a location as latitude and longitude values. GPS transceiver 258 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 258 can determine a physical location for client computer 200. In one or more embodiments, however, client computer 200 may, through other components, provide other information that may be employed to determine a physical location of the client computer, including for example, a Media Access Control (MAC) address, IP address, and the like.

In at least one of the various embodiments, applications, such as, operating system 206, other client apps 224, web browser 226, or the like, may be arranged to employ geo-location information to select one or more localization features, such as, time zones, languages, currencies, calendar formatting, or the like. Localization features may be used in display objects, data models, data objects, user-interfaces, reports, as well as internal processes or databases. In at least one of the various embodiments, geo-location information used for selecting localization information may be provided by GPS 258. Also, in some embodiments, geolocation information may include information provided using one or more geolocation protocols over the networks, such as, wireless network 108 or network 111.

Human interface components can be peripheral devices that are physically separate from client computer 200, allowing for remote input or output to client computer 200. For example, information routed as described here through human interface components such as display 250 or keyboard 252 can instead be routed through network interface 232 to appropriate human interface components located remotely. Examples of human interface peripheral components that may be remote include, but are not limited to, audio devices, pointing devices, keypads, displays, cameras, projectors, and the like. These peripheral components may communicate over a Pico Network such as Bluetooth™, Zigbee™ and the like. One non-limiting example of a client computer with such peripheral human interface components is a wearable computer, which might include a remote pico projector along with one or more cameras that remotely communicate with a separately located client computer to sense a user's gestures toward portions of an image projected by the pico projector onto a reflected surface such as a wall or the user's hand.

A client computer may include web browser application 226 that is configured to receive and to send web pages, web-based messages, graphics, text, multimedia, and the like. The client computer's browser application may employ virtually any programming language, including a wireless application protocol messages (WAP), and the like. In one or more embodiments, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Memory 204 may include RAM, ROM, or other types of memory. Memory 204 illustrates an example of computer-readable storage media (devices) for storage of information such as computer-readable instructions, data structures, program modules or other data. Memory 204 may store BIOS 208 for controlling low-level operation of client computer 200. The memory may also store operating system 206 for controlling the operation of client computer 200. It will be appreciated that this component may include a general-purpose operating system such as a version of UNIX, or LINUX™, or a specialized client computer communication operating system such as Windows Phone™, or the Symbian® operating system. The operating system may include, or interface with a Java virtual machine module that enables control of hardware components or operating system operations via Java application programs.

Memory 204 may further include one or more data storage 210, which can be utilized by client computer 200 to store, among other things, applications 220 or other data. For example, data storage 210 may also be employed to store information that describes various capabilities of client computer 200. The information may then be provided to another device or computer based on any of a variety of methods, including being sent as part of a header during a communication, sent upon request, or the like. Data storage 210 may also be employed to store social networking information including address books, buddy lists, aliases, user profile information, or the like. Data storage 210 may further include program code, data, algorithms, and the like, for use by a processor, such as processor 202 to execute and perform actions. In one embodiment, at least some of data storage 210 might also be stored on another component of client computer 200, including, but not limited to, non-transitory processor-readable removable storage device 236, processor-readable stationary storage device 234, or even external to the client computer.

Applications 220 may include computer executable instructions which, when executed by client computer 200, transmit, receive, or otherwise process instructions and data. Applications 220 may include, for example, client visualization engine 222, other client applications 224, web browser 226, or the like. Client computers may be arranged to exchange communications one or more servers.

Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, visualization applications, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), client computer 200 may include one or more hardware micro-controllers instead of CPUs. In one or more embodiments, the one or more micro-controllers may directly execute their own embedded logic to perform actions and access its own internal memory and its own external Input and Output Interfaces (e.g., hardware pins or wireless transceivers) to perform actions, such as System On a Chip (SOC), or the like.

Illustrative Network Computer

Figure 3:
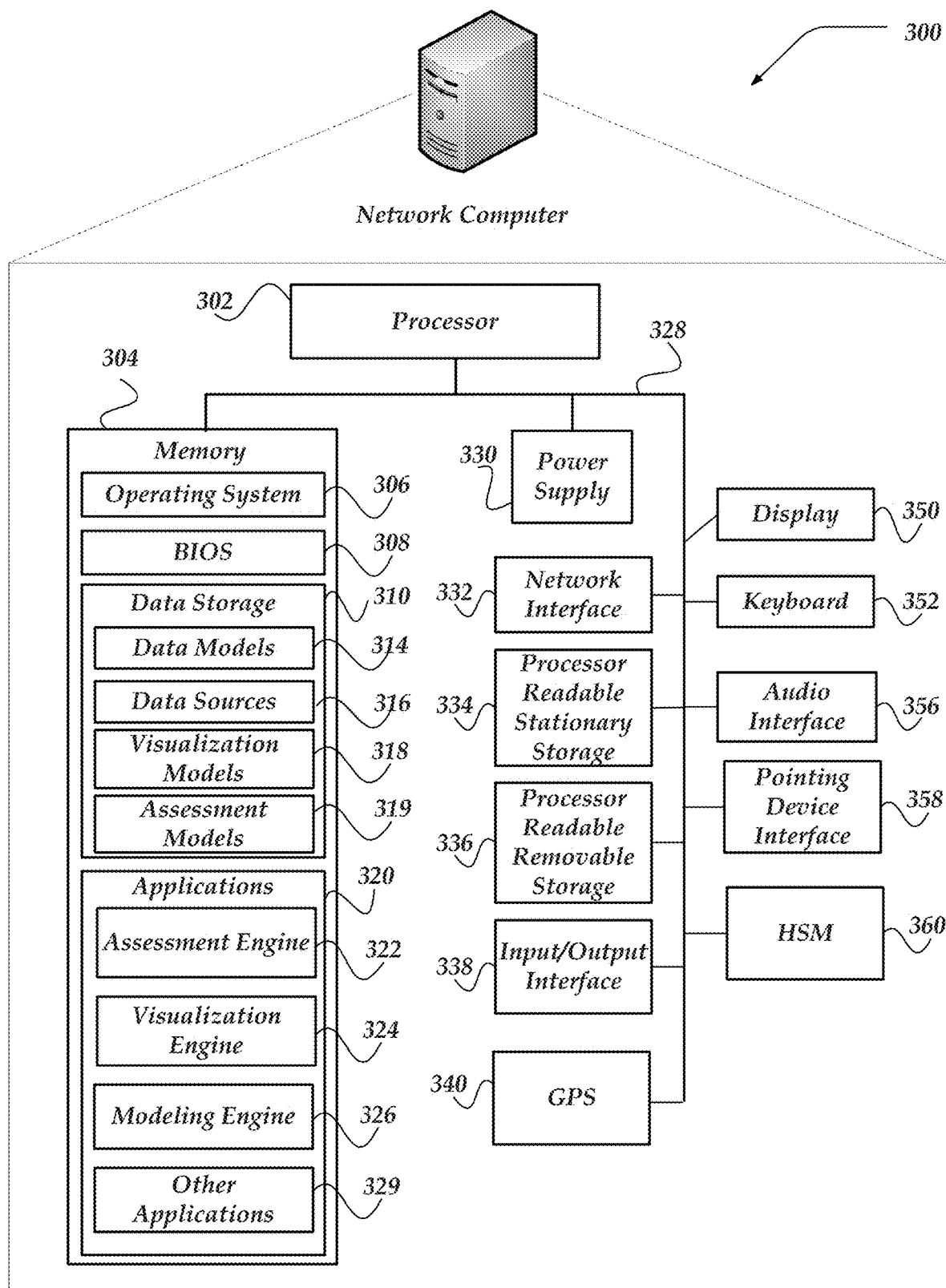
FIG. 3 illustrates a schematic embodiment of a network computer.

FIG. 3 shows one embodiment of network computer 300 that may be included in a system implementing one or more of the various embodiments. Network computer 300 may include many more or less components than those shown in FIG. 3. However, the components shown are sufficient to disclose an illustrative embodiment for practicing these innovations. Network computer 300 may represent, for example, one embodiment of at least one of visualization server computer 116, data source server computer 118, or the like, of FIG. 1.

Network computers, such as, network computer 300 may include a processor 302 that may be in communication with a memory 304 via a bus 328. In some embodiments, processor 302 may be comprised of one or more hardware processors, or one or more processor cores. In some cases, one or more of the one or more processors may be specialized processors designed to perform one or more specialized actions, such as, those described herein. Network computer 300 also includes a power supply 330, network interface 332, audio interface 356, display 350, keyboard 352, input/output interface 338, processor-readable stationary storage device 334, and processor-readable removable storage device 336. Power supply 330 provides power to network computer 300.

Network interface 332 includes circuitry for coupling network computer 300 to one or more networks, and is constructed for use with one or more communication protocols and technologies including, but not limited to, protocols and technologies that implement any portion of the Open Systems Interconnection model (OSI model), global system for mobile communication (GSM), code division multiple access (CDMA), time division multiple access (TDMA), user datagram protocol (UDP), transmission control protocol/Internet protocol (TCP/IP), Short Message Service (SMS), Multimedia Messaging Service (MMS), general packet radio service (GPRS), WAP, ultra-wide band (UWB), IEEE 802.16 Worldwide Interoperability for Microwave Access (WiMax), Session Initiation Protocol/Real-time Transport Protocol (SIP/RTP), or any of a variety of other wired and wireless communication protocols. Network interface 332 is sometimes known as a transceiver, transceiving device, or network interface card (NIC). Network computer 300 may optionally communicate with a base station (not shown), or directly with another computer.

Audio interface 356 is arranged to produce and receive audio signals such as the sound of a human voice. For example, audio interface 356 may be coupled to a speaker and microphone (not shown) to enable telecommunication with others or generate an audio acknowledgment for some action. A microphone in audio interface 356 can also be used for input to or control of network computer 300, for example, using voice recognition.

Display 350 may be a liquid crystal display (LCD), gas plasma, electronic ink, light emitting diode (LED), Organic LED (OLED) or any other type of light reflective or light transmissive display that can be used with a computer. In some embodiments, display 350 may be a handheld projector or pico projector capable of projecting an image on a wall or other object.

Network computer 300 may also comprise input/output interface 338 for communicating with external devices or computers not shown in FIG. 3. Input/output interface 338 can utilize one or more wired or wireless communication technologies, such as USB™, Firewire™, WiFi, WiMax, Thunderbolt™, Infrared, Bluetooth™, Zigbee™, serial port, parallel port, and the like.

Also, input/output interface 338 may also include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like. Sensors may be one or more hardware sensors that collect or measure data that is external to network computer 300. Human interface components can be physically separate from network computer 300, allowing for remote input or output to network computer 300. For example, information routed as described here through human interface components such as display 350 or keyboard 352 can instead be routed through the network interface 332 to appropriate human interface components located elsewhere on the network. Human interface components include any component that allows the computer to take input from, or send output to, a human user of a computer. Accordingly, pointing devices such as mice, styluses, track balls, or the like, may communicate through pointing device interface 358 to receive user input.

GPS transceiver 340 can determine the physical coordinates of network computer 300 on the surface of the Earth, which typically outputs a location as latitude and longitude values. GPS transceiver 340 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 340 can determine a physical location for network computer 300. In one or more embodiments, however, network computer 300 may, through other components, provide other information that may be employed to determine a physical location of the client computer, including for example, a Media Access Control (MAC) address, IP address, and the like.

In at least one of the various embodiments, applications, such as, operating system 306, assessment engine 322, visualization engine 324, modeling engine 326, other applications 329, or the like, may be arranged to employ geolocation information to select one or more localization features, such as, time zones, languages, currencies, currency formatting, calendar formatting, or the like. Localization features may be used in user interfaces, dashboards, visualizations, reports, as well as internal processes or databases. In at least one of the various embodiments, geo-location information used for selecting localization information may be provided by GPS 340. Also, in some embodiments, geolocation information may include information provided using one or more geolocation protocols over the networks, such as, wireless network 108 or network 111.

Memory 304 may include Random Access Memory (RAM), Read-Only Memory (ROM), or other types of memory. Memory 304 illustrates an example of computer-readable storage media (devices) for storage of information such as computer-readable instructions, data structures, program modules or other data. Memory 304 stores a basic input/output system (BIOS) 308 for controlling low-level operation of network computer 300. The memory also stores an operating system 306 for controlling the operation of network computer 300. It will be appreciated that this component may include a general-purpose operating system such as a version of UNIX, or LINUX™, or a specialized operating system such as Microsoft Corporation's Windows® operating system, or the Apple Corporation's OSX® operating system. The operating system may include, or interface with one or more virtual machine modules, such as, a Java virtual machine module that enables control of hardware components or operating system operations via Java application programs. Likewise, other runtime environments may be included.

Memory 304 may further include one or more data storage 310, which can be utilized by network computer 300 to store, among other things, applications 320 or other data. For example, data storage 310 may also be employed to store information that describes various capabilities of network computer 300. The information may then be provided to another device or computer based on any of a variety of methods, including being sent as part of a header during a communication, sent upon request, or the like. Data storage 310 may also be employed to store social networking information including address books, buddy lists, aliases, user profile information, or the like. Data storage 310 may further include program code, data, algorithms, and the like, for use by a processor, such as processor 302 to execute and perform actions such as those actions described below. In one embodiment, at least some of data storage 310 might also be stored on another component of network computer 300, including, but not limited to, non-transitory media inside processor-readable removable storage device 336, processor-readable stationary storage device 334, or any other computer-readable storage device within network computer 300, or even external to network computer 300. Data storage 310 may include, for example, data models 314, data sources 316, visualization models 318, assessment models 319, or the like.

Applications 320 may include computer executable instructions which, when executed by network computer 300, transmit, receive, or otherwise process messages (e.g., SMS, Multimedia Messaging Service (MMS), Instant Message (IM), email, or other messages), audio, video, and enable telecommunication with another user of another mobile computer. Other examples of application programs include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth. Applications 320 may include assessment engine 322, visualization engine 324, modeling engine 326, other applications 329, or the like, that may be arranged to perform actions for embodiments described below. In one or more of the various embodiments, one or more of the applications may be implemented as modules or components of another application. Further, in one or more of the various embodiments, applications may be implemented as operating system extensions, modules, plugins, or the like.

Furthermore, in one or more of the various embodiments, assessment engine 322, visualization engine 324, modeling engine 326, other applications 329, or the like, may be operative in a cloud-based computing environment. In one or more of the various embodiments, these applications, and others, that comprise the management platform may be executing within virtual machines or virtual servers that may be managed in a cloud-based based computing environment. In one or more of the various embodiments, in this context the applications may flow from one physical network computer within the cloud-based environment to another depending on performance and scaling considerations automatically managed by the cloud computing environment. Likewise, in one or more of the various embodiments, virtual machines or virtual servers dedicated to assessment engine 322, visualization engine 324, modeling engine 326, other applications 329, or the like, may be provisioned and de-commissioned automatically.

Also, in one or more of the various embodiments, assessment engine 322, visualization engine 324, modeling engine 326, other applications 329, or the like, may be located in virtual servers running in a cloud-based computing environment rather than being tied to one or more specific physical network computers.

Further, network computer 300 may also comprise hardware security module (HSM) 360 for providing additional tamper resistant safeguards for generating, storing or using security/cryptographic information such as, keys, digital certificates, passwords, passphrases, two-factor authentication information, or the like. In some embodiments, hardware security module may be employed to support one or more standard public key infrastructures (PKI), and may be employed to generate, manage, or store keys pairs, or the like. In some embodiments, HSM 360 may be a stand-alone network computer, in other cases, HSM 360 may be arranged as a hardware card that may be installed in a network computer.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include one or more hardware microcontrollers instead of a CPU. In one or more embodiments, the one or more microcontrollers may directly execute their own embedded logic to perform actions and access their own internal memory and their own external Input and Output Interfaces (e.g., hardware pins or wireless transceivers) to perform actions, such as System On a Chip (SOC), or the like.

Illustrative Logical System Architecture

Figure 4:
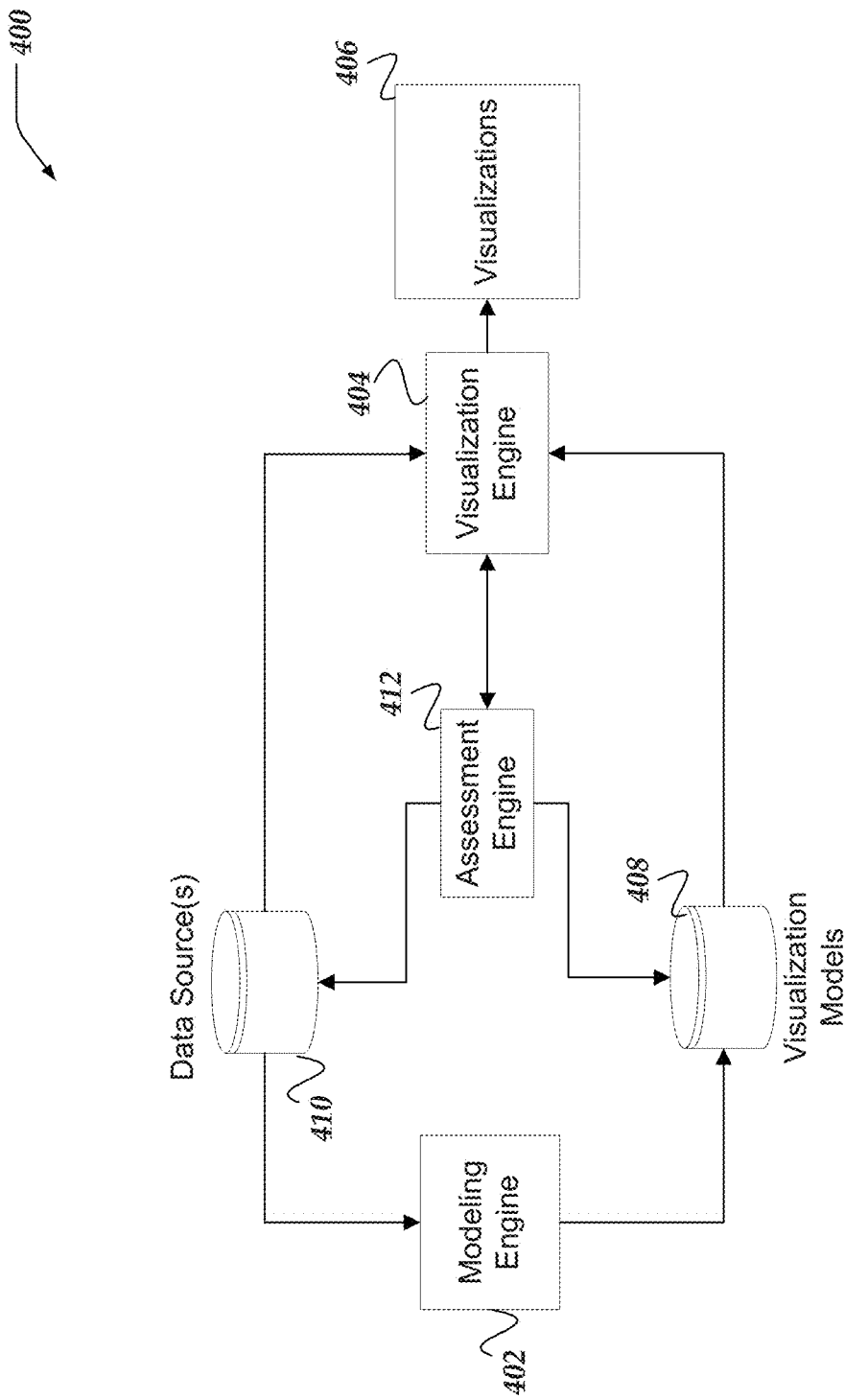
FIG. 4 illustrates a logical architecture of a system for surfacing visualization mirages in accordance with one or more of the various embodiments.

FIG. 4 illustrates a logical architecture of system 400 for surfacing visualization mirages in accordance with one or more of the various embodiments. In one or more of the various embodiments, system 400 may be comprised of various components, including, one or more modeling engines, such as, modeling engine 402; one or more visualization engines, such as, visualization engine 404; one or more visualizations, such as, visualization 406; one or more data sources, such as, data source 410; one or more visualization models, such as, visualization models 408; or one or more assessment engines, such as, assessment engine 412.

In one or more of the various embodiments, modeling engine 402 may be arranged to enable users to design one or more visualization models that may be provided to visualization engine 404. Accordingly, in one or more of the various embodiments, visualization engine 404 may be arranged to generate one or more visualizations based on the visualization models.

In one or more of the various embodiments, modeling engines may be arranged to access one or more data sources, such as, data source 410. In some embodiments, modeling engines may be arranged to include user interfaces that enable users to browse various data source information, data objects, or the like, to design visualization models that may be used to generate visualizations of the information stored in the data sources.

Accordingly, in some embodiments, visualization models may be designed to provide visualizations that include charts, plots, graphs, tables, graphics, styling, explanatory text, interactive elements, user interface features, or the like. In some embodiments, users may be provided a graphical user interface that enables them to interactively design visualization models such that various elements or display objects in the visualization model may be associated with data from one or more data sources, such as, data source 410.

In one or more of the various embodiments, data sources, such as, data source 410 may include one or more of databases, data stores, file systems, or the like, that may be located locally or remotely. In some embodiments, data sources may be provided by another service over a network. In some embodiments, there may be one or more components (not shown) that filter or otherwise provide management views or administrative access to the data in a data source.

In one or more of the various embodiments, visualization models may be stored in one or more data stores, such as, visualization model storage 408. In this example, for some embodiments, visualization model storage 408 represents one or more databases, file systems, or the like, for storing, securing, or indexing visualization models.

In one or more of the various embodiments, visualization engines, such as, visualization engine 404 may be arranged to parse or otherwise interpret the visualization models and data from data sources to generate one or more visualizations that may be displayed to users.

In one or more of the various embodiments, assessment engines, such as, assessment engine 412 may be arranged to assess or otherwise evaluate visualizations. Accordingly, in some embodiments, assessment engines may be arranged to automatically perform one or more actions to identify possible mirages or artifacts in visualizations that result in misleading visualizations. In some embodiments, assessment engines may be arranged to automatically pull in additional data from the data source associated with a visualization and evaluate its relevancy using statistical models, such as, assessment models.

Figure 5A:
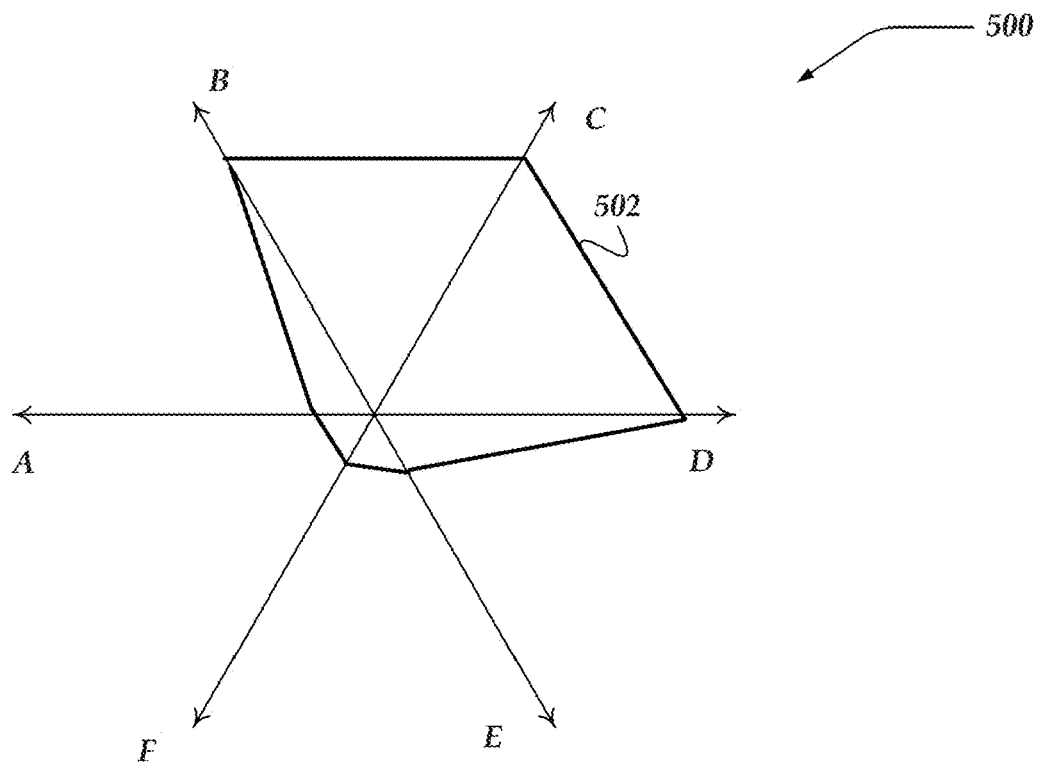
FIG. 5A illustrates a representation of a portion of a visualization for surfacing visualization mirages in accordance with one or more of the various embodiments.
Figure 5B:
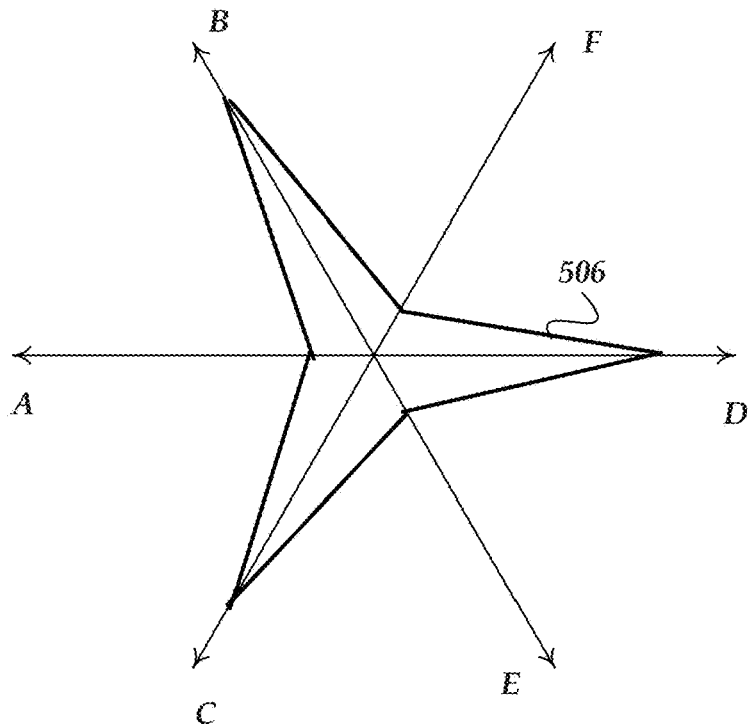
FIG. 5B illustrates a representation of a portion of a visualization for surfacing visualization mirages in accordance with one or more of the various embodiments.

FIGS. 5A and 5B shows examples of how visualizations may be misleading.

FIG. 5A illustrates a representation of a portion of visualization 500 for surfacing visualization mirages in accordance with one or more of the various embodiments. In this example, visualization 500 may be considered a radar chart. In some cases, radar charts may be used to compare the skills of job candidates. In this example visualization 500 shows job skills for a hypothetical job candidate where each axis (e.g., A, B, C, D, E, and F) represents a skill level of a particular job skill. And, in this example, where line 502 intersects with an axis indicates the job candidate's skill level for a particular job skill. Accordingly, in this example, the job candidate has a high level of competency in job skills B, C, and D and lesser competency in job skills A, F, and E.

Thus, at a glance, visualization 500 seems to indicate that the job candidate may have a concentrated skill set because the job candidate appears to have skills that appear to be concentrated at upper-right portion of the visualization.

FIG. 5B illustrates a representation of a portion of visualization 504 for surfacing visualization mirages in accordance with one or more of the various embodiments. In this example, similar to visualization 500, visualization 504 may be considered a radar chart. Likewise, in this example, visualization 504 shows job skills for a hypothetical job candidate where each axis (e.g., A, B, C, D, E, and F) represents a skill level of a particular job skill. And, in this example, where line 506 intersects with an axis indicates the job candidate's skill level for a particular job skill. Accordingly, similar to visualization 500, visualization 504 shows that the job candidate has a high level of competency in job skills B, C, and D and lesser competency in job skills A, F, and E.

However, in this example, the position in the visualization of axis C and axis F have been swapped. Thus, in contrast to visualization 500, visualization 504 seems to indicate that the job candidate may have a more diverse skill set (e.g., less concentrated) because the job candidate appears to have skills that appear to be spread more evenly in the visualization.

In this example, the difference in appearance of visualization 500 and visualization 504 are very different even though the underlying data may be the same. Accordingly, in this example, one or more visualization mirages may be present.

Figure 6A:
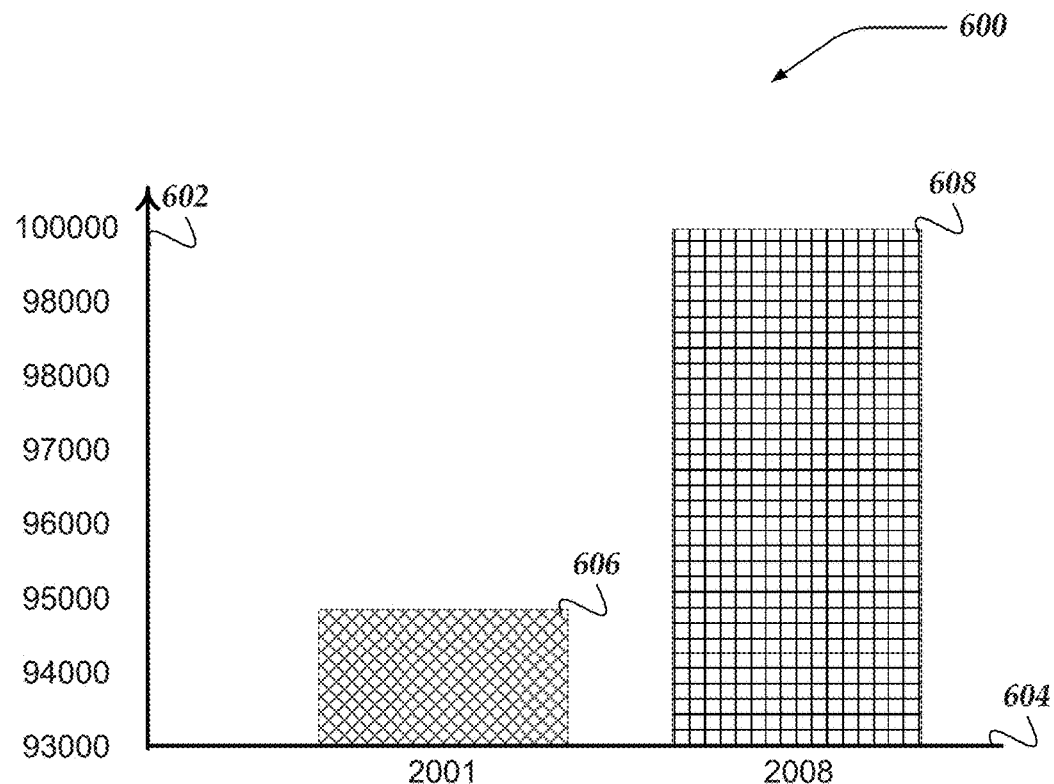
FIG. 6A illustrates a portion of a visualization that includes a bar chart that compares home prices.
Figure 6B:
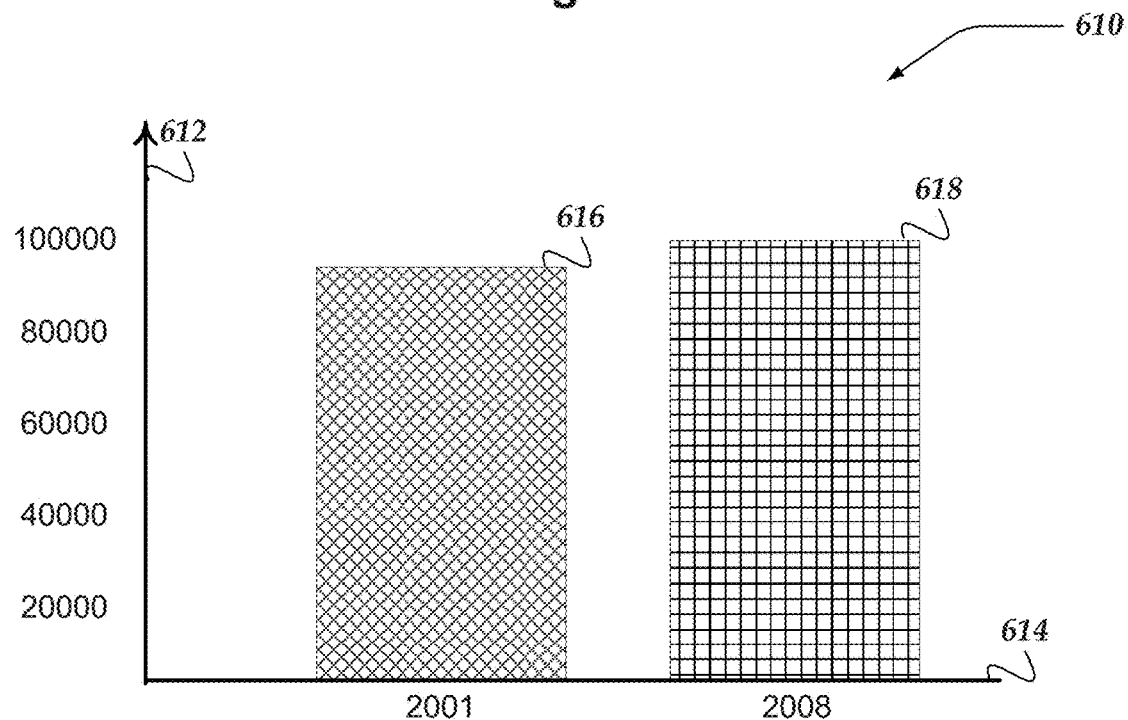
FIG. 6B illustrates a portion of a visualization that includes a bar chart that compares home prices.

FIGS. 6A and 6B, similar to FIGS. 5A and 5B illustrate another example of how mirages may be included in otherwise reasonable appearing visualizations.

FIG. 6A illustrates a portion of visualization 600 that includes a bar chart that compares home prices (represented by axis 602) for the year 2001 and prices for the year 2008 (year category represented by axis 604. Accordingly, in this example, the visual appearance of visualization 600 appears to indicate that from year 2001 to year 2008 prices have increased by 300% because of the relative sizes of the bars used in the bar.

FIG. 6B illustrates a portion of visualization 610 that includes a bar chart that compares home prices (represented by axis 612) for the year 2001 and prices for the year 2008 (year category represented by axis 614. Accordingly, in this example, the visual appearance of visualization 614 appears to indicate that from year 2001 to year 2008 prices have barely increased because of the relative sizes of the bars used in the bar.

In this example, the visual appearance of FIG. 6A and FIG. 6B may seem to suggest completely different conclusions. FIG. 6A seems to show that prices have changed dramatically while FIG. 6B seems to show that prices have not increased dramatically. Importantly, in this example, and in the example shown for FIGS. 5A and 5B, visualizations can have very different appearance even if underlying data or the type of visualization may be similar. Visualizations that may be resistant to this type of effect (e.g., mirages) may be considered robust visualizations.

Note, one of ordinary skill in the art will appreciate that visualization models or visualization engines may be arranged to generate many different types of visualizations for various purposes depending on the design goals of author, users, or organizations. Here, visualization 500, visualization 504, visualization 600, and visualization 610 are presented as a non-limiting examples to help provide clarity to the description of these innovations. One of ordinary skill in the art will appreciate that these examples are at least sufficient to disclose the innovations herein and that visualization engines or visualization models may be arranged to generate many different visualizations for many different purposes in many domains.

Figure 7:
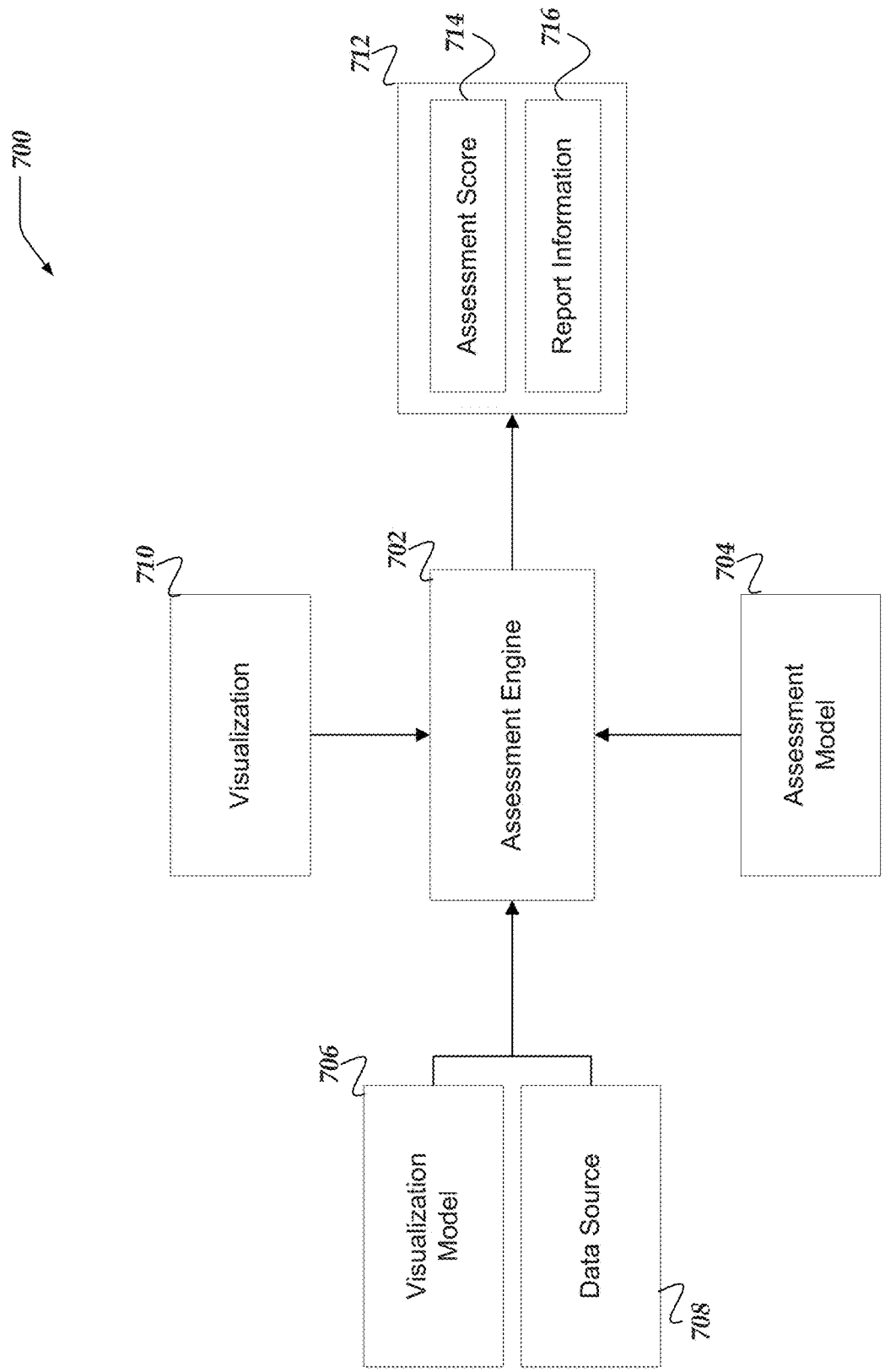
FIG. 7 illustrates a logical representation of a portion of an assessment system in accordance with one or more of the various embodiments.

FIG. 7 illustrates a logical representation of a portion of assessment system 700 in accordance with one or more of the various embodiments. In one or more of the various embodiments, system 700 may include one or more components, such as, assessment engine 702, assessment model 704, visualization model 706, data source 708, visualization 710, assessment result 712, or the like. In some embodiments, assessment results, such as, assessment result 712 may be arranged to include additional information, such as, assessment score 714, report information 716, or the like.

In one or more of the various embodiments, assessment engine 702 may be arranged to assess visualization 710 based on assessment model 704. In one or more of the various embodiments, assessment models may be arranged to include one or more heuristics or machine-learning evaluators that may be executed to evaluate visualizations.

As discussed herein, assessment engines may be arranged to employ one or more assessment models and provide information for one or more reports regarding how well a given assessment model matches (or classifies) a visualization. Accordingly, in this example, assessment result 712 includes a score, such as, assessment score 714 and report information 716.

In one or more of the various embodiments, assessment models may be arranged to provide an assessment score, such as, a probability score, confidence score, or the like, that represent the quality of the assessment. In some embodiments, assessment engines may be arranged to execute or apply assessment models to perform various action to evaluate of the visualizations, visualization models, or data sources to determine if a given visualization may include one or more visualization mirages.

In one or more of the various embodiments, different assessment models may employ different scoring criteria. Accordingly, in some embodiments, assessment engines may be arranged to weight or normalize assessment scores provided by different assessment models. In some embodiments, the particular normalization rules or weight rules for normalizing or weighting assessment model assessment scores may be provided via configuration information to account for local conditions.

In one or more of the various embodiments, assessment models may be designed or tailored to evaluate one or more statistical features of data associated with potential mirages. Accordingly, in one or more of the various embodiments, assessment engines may be arranged to apply one or more assessment models to assess if the data associated with visualizations under assessment have the one or more of the statistical features targeted by an assessment model. In some embodiments, assessment models may be arranged to provide the assessment score as a form of a self-grade that represents how close the data associated with the visualization matches the statistical features the assessment model may be designed to match or otherwise evaluate.

Accordingly, in one or more of the various embodiments, assessment engines may be arranged to employ user activity information or user feedback to automatically build assessment model profiles that may be employed to modify or customize assessment reports. For example, if users of an organization consistently report mismatches between visualizations and assessment results, the assessment engine may be arranged to introduce weighting rules that increase or decrease the effective assessment scores used for ranking assessment results for the organization based on the user feedback information.

In one or more of the various embodiments, if a user selects a visualization for mirage assessment, the assessment engine may determine one or more assessment models and apply them to the visualizations being assessed, as well as, as its associated visualization model or data source. Accordingly, non-limiting examples of assessment models are discussed below. For brevity and clarity this discussion is limited to a few examples, however, one of ordinary skill in the art will appreciate that other assessment models that may incorporate other or additional assessment strategies are contemplated.

In one or more of the various embodiments, under an analysis framework known as Algebraic Visualization Design (AVD), trivial changes to the data underlying a visualization (such as shuffling the row order of input data) should result in trivial changes in the resulting visualization, and important changes in the visual appearance of the visualization should only occur as a result of correspondingly important changes in the backing data. One of ordinary skill in the art will appreciated that AVD formalizes these assertions through a commutativity relation, which describes the properties of an effective visualization across potential data transformations (not shown).

In one or more of the various embodiments, failures of the AVD assertions may result in "hallucinators" (visualizations that look dramatically different despite being backed by similar or identical data, such as in FIG. 5A, 5B, ˆa, or 6B) and "confusers" (visualizations that look identical despite being backed by dramatically different data). In some cases, visualizations may be completely non-responsive to their backing data, functioning as mere number decorations and creating what may be referred to as visualization "non-sequiturs." In some cases, these AVD failures may directly tied to visualization mirages (as they my result in visualizations that my be fragile, non-robust, or non-responsive). However, AVD provide an analytical language of manipulations of data and visualization specification that enables to automatic evaluation by assessment models. Accordingly, in some embodiments AVD may provide a useful framework for designing tests that may detect failures that require little domain knowledge. For example, in some cases, AVD based assessment models may simply induce trivial or non-trivial data change, and check for corresponding changes in the resulting visualization.

In one or more of the various embodiments, assessment engines may be arranged to employ metamorphic testing as a mechanism to validate or otherwise evaluate individual visualizations. In some embodiments, assessment engines may be arranged to employ assessment models that may execute metamorphic manipulations: alterations to the data and alterations to the design specification. Accordingly, in some embodiments, assessment engines may be enabled to evaluate a wide variety of types of visualization without knowing much about the visualization being rendered.

In one or more of the various embodiments, changes to the order of the input data should not change the rendered visualization. Accordingly, in some embodiments, assessment models may be arranged to employ detection techniques such as pixel differencing algorithms that define a maximum number of pixels differing between the rendered images based of the order of the input rows. Accordingly, in some embodiments, assessment models that provide this type of test may enable detection of over plotting. Note, in some embodiments, while not all over-plotting is necessarily indicative of a visualization mirage, alerting the user to its presence may be useful across many visualization types.

In some embodiments, apparent patterns in visualizations should be robust: that is, a particular relationship should continue to be present across minor changes. Accordingly, one or more assessment models may be arranged to focus on providing mirage detectors for bar charts. In some embodiments, such assessment models may test for variability in a relatively parameter-free way across a wide variety of data distributions and complexities. In some embodiments, assessment models may be arranged to identify which input rows to modify by creating a notion of backward provenance that links each aggregate mark to the input tuples that describe it. Accordingly, assessment models may be able to identify when visualizations are liable to be dependent on outliers or small number of divergent records are driving differences between aggregates.

In one or more of the various embodiments, assessment models may be arranged to evaluate that aggregates that may commonly and advantageously useful for summarize information. However, in some cases, aggregates may mask data problems, such as differing number of records, sampling issues, repeated records, or the like. Accordingly, in some embodiments, assessment models may be arranged to evaluate the robustness of measures in the context of potentially dirty data. In some embodiments, assessment models may be configured define a minimum number of records that make up an aggregate, and contracts the number of records constituting all other marks down to that minimum through sampling without replacement. In some embodiments, assessment models may employ a randomization procedure to probe the aggregates in a visualization. Accordingly, if all aggregates have similar samples sizes, and this sample size is sufficiently large, and the aggregation method sufficiently robust to extreme values, this procedure ought to result in reasonably similar visualization. Thus, in some embodiments, assessment models may be arranged to detect variability caused by sampling issues and other problems relating to differing number of records.

Figure 8:
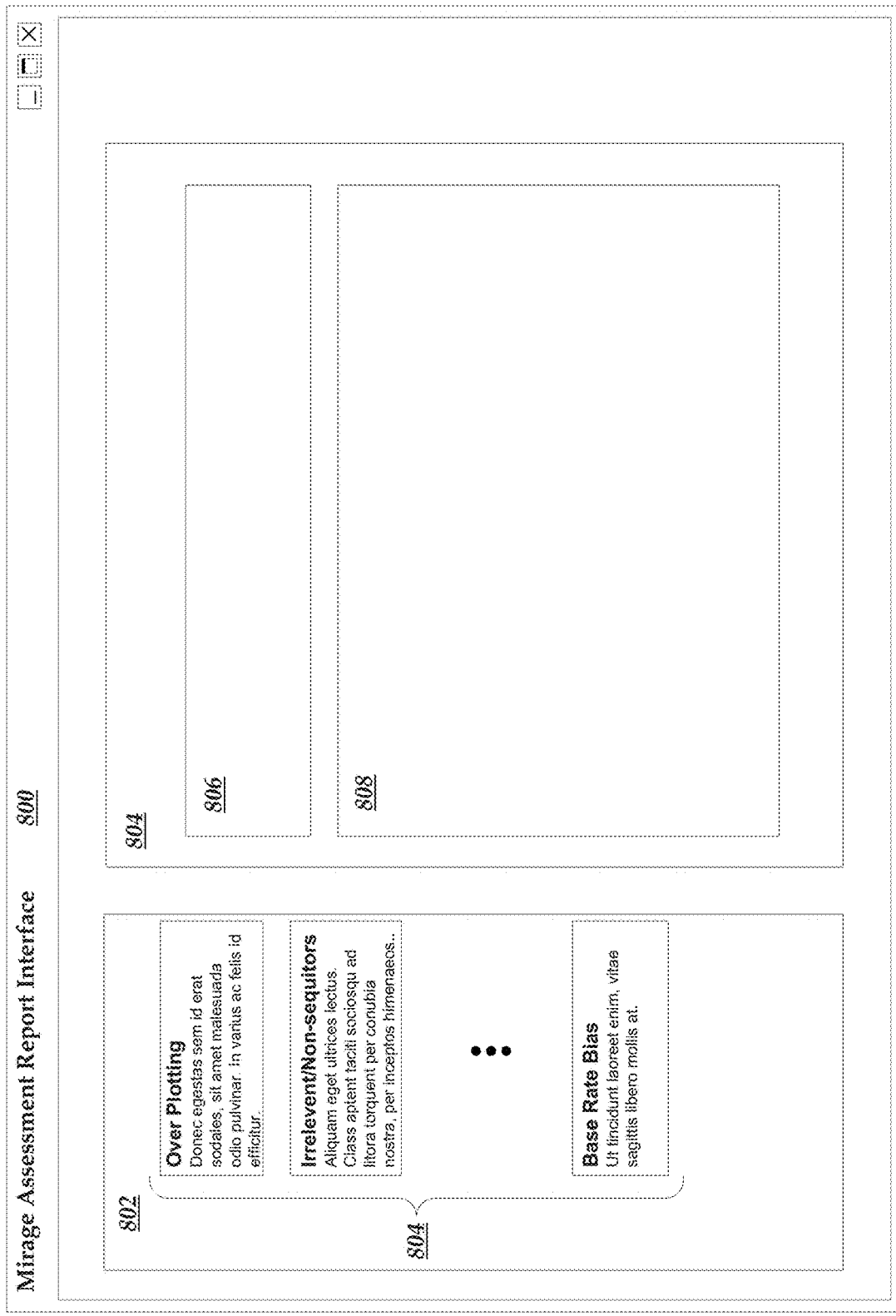
FIG. 8 illustrates a logical representation of a portion of a user interface for surfacing visualization mirages in accordance with one or more of the various embodiments.

FIG. 8 illustrates a logical representation of a portion of user interface 800 for surfacing visualization mirages in accordance with one or more of the various embodiments. In some embodiments, user interface 800 may be arranged to include one or more panels, such as, panel 802, panel 804, panel 806, panel 808, explanations 810, or the like.

In this example, for one or more of the various embodiments, panel 802 may be arranged to display a rank order list of the mirage assessment information for the visualization that was assessed by the assessment engine. In some embodiments, each report item may include information describing the type of mirage that may be suspected, including an assessment score, or the like, if one may be available.

Likewise, in some embodiments, if the assessment engine may be unable to determine a potential mirage, panel 802 may be arranged to display a narrative to that effect.

In one or more of the various embodiments, panel 804 may be arranged to include additional explanations or visualizations that may be related to the visualization that was assessed by the assessment engine. In some embodiments, panels, such as, panel 806 may include additional explanation information related to the detected mirages, or one or more visualizations that may help explain the mirages to users. Also, in some embodiments, panels, such as, panel 808 may include the visualization under assessment or other visualizations that may help a user "see" the effect of the determined mirages. For example, panel 808 may include one or more alternate visualizations that help illustrate the effect of the detected mirages.

In one or more of the various embodiments, assessment engines, visualization engines, or the like, may be arranged to use specific visualization models or explanation text/narrative templates for different assessment models. In some embodiments, the visualization models or explanation/narrative templates for an assessment model may be defined in configuration information. Accordingly, the report information (e.g., explanations/narrative text) or visualizations included in user interface 800 may be tailored for a particular organization, locale, or the like.

In one or more of the various embodiments, assessment engines or visualization engines may be arranged to determine some or all of the content or styling for user interface 800 via configuration information. Accordingly, in some embodiments, panel layout, explanation text, templates, visualizations, or the like, may be configured differently depending on local circumstances.

Generalized Operations

FIGS. 9-12 represent generalized operations for surfacing visualization mirages in accordance with one or more of the various embodiments. In one or more of the various embodiments, processes 900, 1000, 1100, and 1200 described in conjunction with FIGS. 9-12 may be implemented by or executed by one or more processors on a single network computer (or network monitoring computer), such as network computer 300 of FIG. 3. In other embodiments, these processes, or portions thereof, may be implemented by or executed on a plurality of network computers, such as network computer 300 of FIG. 3. In yet other embodiments, these processes, or portions thereof, may be implemented by or executed on one or more virtualized computers, such as, those in a cloud-based environment. However, embodiments are not so limited and various combinations of network computers, client computers, or the like may be utilized. Further, in one or more of the various embodiments, the processes described in conjunction with FIGS. 9-12 may be used for surfacing visualization mirages in accordance with at least one of the various embodiments or architectures such as those described in conjunction with FIGS. 4-8. Further, in one or more of the various embodiments, some or all of the actions performed by processes 900, 1000, 1100 and 1200 and may be executed in part by assessment engine 322, visualization engine 324, modeling engine 326, or the like.

Figure 9:
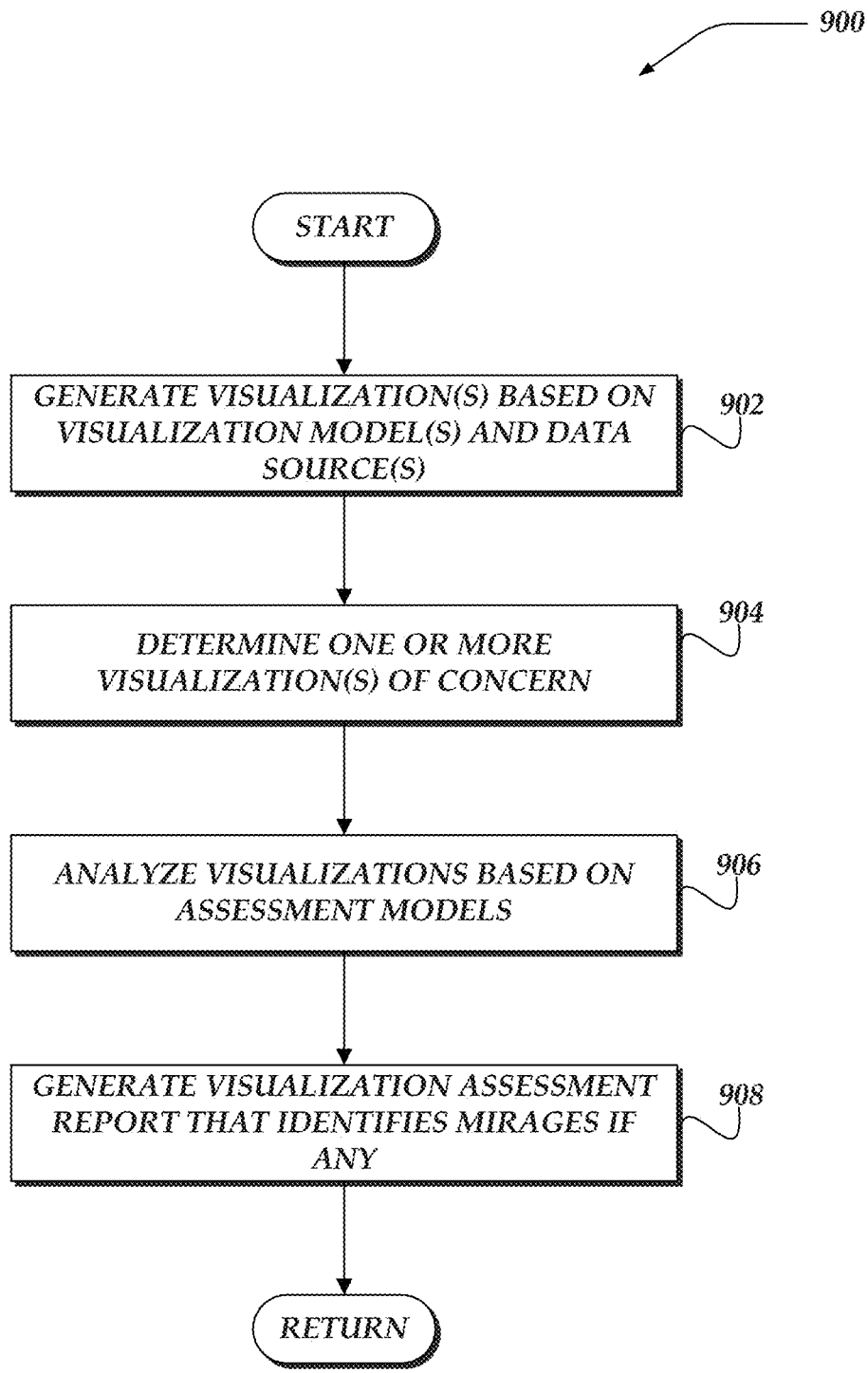
FIG. 9 illustrates an overview flowchart for a process for surfacing visualization mirages in accordance with one or more of the various embodiments.

FIG. 9 illustrates an overview flowchart for process 900 for surfacing visualization mirages in accordance with one or more of the various embodiments. After a start block, at block 902, in one or more of the various embodiments, a visualization engine may be arranged to generate one or more visualizations based on one or more visualization models or data sources. As described above, a visualization system may be arranged to include, one or more modeling engines, one or more data sources, one or more visualization engines, or the like, that may be arranged to generate visualizations based on one or more visualization models and data provided by the one or more data sources.

At block 904, in one or more of the various embodiments, optionally, an assessment engine may be arranged to determine one or more visualizations that may be of interest.

In one or more of the various embodiments, users or visualization authors may be enabled to select one or more visualizations for mirage analysis. For example, a user interface may be provided to enable an author to browse one or more visualizations that have been generated previously.

Similarly, in one or more of the various embodiments, assessment engines may be arranged to automatically assess visualizations as they are created. In some embodiments, one or more visualizations may be determined for assessment based on their membership in one or more classes or types of visualizations.

In one or more of the various embodiments, assessment engines may be arranged to apply various heuristics or filters to determine which visualizations to assess for mirages. Accordingly, in some embodiments, assessment engines may be arranged to employ one or more rules or instructions provided via configuration information to determine if a visualization should be automatically assessed for mirages.

In some embodiments, assessment engines may be arranged to select or recommend one or more visualizations for assessment based on criteria provided via configuration information.

At block 906, in one or more of the various embodiments, assessment engines may be arranged to analyze the one or more visualizations of interest based one or more assessment models. In one or more of the various embodiments, assessment engines may be arranged to execute one or more assessment models to assess the one or more visualizations to determine if there may be visualization mirages hidden in the one or more visualizations.

At block 908, in one or more of the various embodiments, assessment engines may be arranged to generate one or more mirage assessment reports that may include one or more visualizations that demonstrate the discovered mirages, if any. As described above, in some embodiments, assessment reports may include interactive user interfaces that enable users to review the potential visualization mirages that may have been discovered by the assessment engine.

Next, in one or more of the various embodiments, control may be returned to a calling process.

Figure 10:
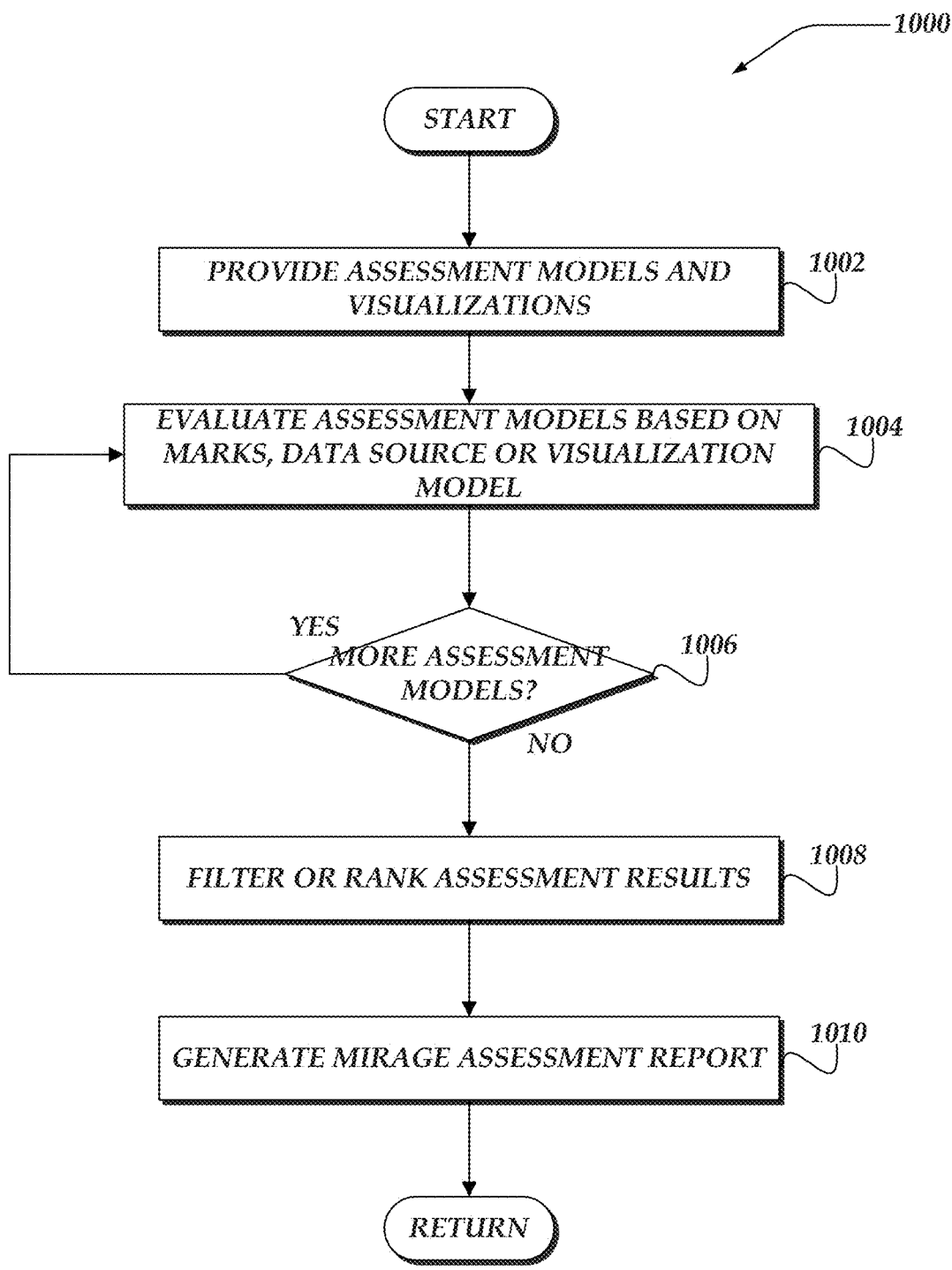
FIG. 10 illustrates a flowchart of a process for assessing visualizations to discover visualization mirages in accordance with one or more of the various embodiments.

FIG. 10 illustrates a flowchart of process 1000 for assessing visualizations to discover visualization mirages in accordance with one or more of the various embodiments. After a start block, at block 1002, in one or more of the various embodiments, an assessment engine may be provided one or more assessment models and one or more visualizations. As described above, in some embodiments, one or more assessment models may be defined for discovering visualization mirages. Accordingly, in some embodiments, the assessment engine may be arranged to obtain one or more assessment models from a data store, or the like. In some embodiments, assessment engines may be arranged to determine the particular assessment models based on rules, conditions, or the like, that may be provided via configuration information.

At block 1004, in one or more of the various embodiments, the assessment engine may be arranged to evaluate the one or more assessment models based on the marks, visualization models, data sources, or the like. In one or more of the various embodiments, assessment models may include or be associated with rules, conditions, computer readable instructions, or the like, that an assessment engine may execute or apply to assess if a visualization may include one or more visualization mirages.

At decision block 1006, in one or more of the various embodiments, if there may be more assessment models to evaluate, control may loop back to block 1004; otherwise, control may flow to block 908. In some embodiments, assessment engines may be arranged to end the assessment early by omitting or skipping one or more assessment models. For example, in some embodiments, assessment engines may be configured stop evaluating additional assessment models if a previously evaluated assessment model may be considered to provide a sufficient mirage analysis. In some embodiments, one or more assessment models may become redundant or moot depending if one or more other assessment models identify or exclude some mirages.

In one or more of the various embodiments, assessment engines may be arranged to associate an assessment score with assessment results provided by an assessment model. In some embodiments, assessment models may be arranged to provide an assessment score that indicates how well the assessment model matches up against a particular visualization mirage.

Also, in one or more of the various embodiments, assessment engines may be arranged to maintain another set of assessment scores that may be combined with the assessment score provided by each assessment model employed to identify a visualization mirage. Thus, in some embodiments, the overall assessment score associated with a discovered mirage may be a combination of a score provided by the assessment model and a score provided by the assessment engine.

For example, in some embodiments, the assessment score provided by the assessment engine may be generated based on other factors or metrics that may be unavailable or irrelevant to an assessment model. In some embodiments, such factors or metrics may be based on user feedback, organization requirements (e.g., configuration information), metrics associated with organization or community activity, or the like.

At block 1008, in one or more of the various embodiments, the assessment engine may be arranged to filter or rank the results provided by the assessment models. In one or more of the various embodiments, assessment models may be arranged to provide one or more assessment scores that represent a self-assessment of the quality of the mirage determination.

Also, in one or more of the various embodiments, assessment engines may be arranged to modify assessment scores provided by assessment models to provide a final assessment score.

Accordingly, in one or more of the various embodiments, assessment engines may be arranged to eliminate one or more determined mirages based on filtering out one or more assessment models based on rules, conditions, or the like. For example, in some embodiments, an assessment engine may be configured to automatically exclude one or more mirages that are associated with assessment scores that fall below a defined threshold value.

Also, in one or more of the various embodiments, other metrics or features of one or more of the visualization models, data sources, data, users, organizations, or the like, may be incorporated into conditions, rules, or the like, that may be executed to filter out one or more assessments or mirages. For example, in some embodiments, filters may include conditions associated with one or more user roles. Accordingly, for example, a filter may be configured to be more inclusive for some user roles or less inclusive for other user roles. Thus, in this example, the number of potential mirages included in an assessment report may be increased for data scientists or reduced for regular users.

In some embodiments, other metrics or features used for filtering may be based on various sources, including, organization preferences, user preferences, localization, user input, other configuration information, or the like.

Similarly, in one or more of the various embodiments, assessment engines may be arranged to rank order the one or more discovered mirages based on various conditions, rules, metrics, or features. For example, in some embodiments, discovered mirages (e.g., potential mirages) may be rank ordered based on assessment scores, or the like. Further, for example, in some embodiments, one or more explanations may be rank ordered based on user preferences, organization preferences, or the like.

Similar to filters, in some embodiments, the various conditions, rules, metrics, or features used for rank ordering explanations may be based on various sources, including, organization preferences, user preferences, localization, user input, other configuration information, or the like.

At block 1010, in one or more of the various embodiments, the assessment engine may be arranged to generate an mirage assessment report. In one or more of the various embodiments, mirage assessment reports may include a variety of information, including the rank ordered list of potential or discovered mirages, descriptions of one or more characteristics of the various mirages, visualizations that show the how the mirage manifests itself in different contexts or views, or the like.

Next, in one or more of the various embodiments, control may be returned to a calling process.

Figure 11:
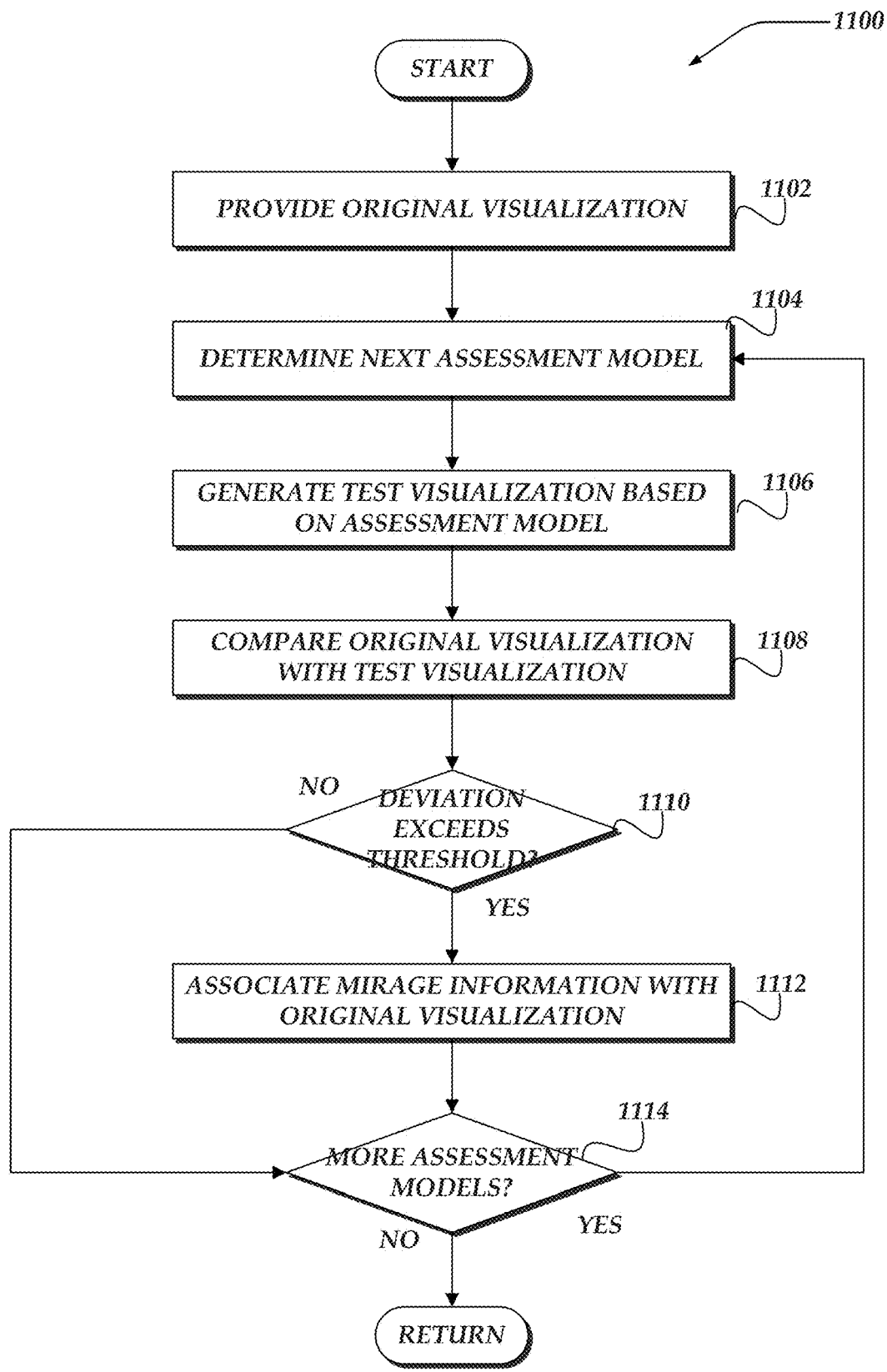
FIG. 11 illustrates a flowchart of a process for determining visualizations to that may include one or more visualization mirages in accordance with one or more of the various embodiments.

FIG. 11 illustrates a flowchart of process 1100 for determining visualizations to that may include one or more visualization mirages in accordance with one or more of the various embodiments. After a start block, at block 1102, in one or more of the various embodiments, an assessment engine may be provided an original visualization. Accordingly, in one or more of the various embodiments, the assessment engine may be provided a visualization generated based on a visualization model, one or more data models, one or more data sources, or the like.

In one or more of the various embodiments, assessment engines may be provided the models, data, or information that may have been used to generate the visualization.

At block 1104, in one or more of the various embodiments, the assessment engine may be arranged to determine a next assessment model. As described above, in some embodiments, there may be several different assessment models that may be employed to discover mirages in given visualization. In some embodiments, assessment models may be provided in any sequence. However, in some embodiments, different types or classes of assessment models may be grouped such that they may be employed together or near-in-time. For example, in some embodiments, there may be one or more classes of assessment models that require one or more of the same processing actions as part of determining visualization mirages. Accordingly, in some embodiments, assessment models that may be dependent some of the same data processing may be executed together or near-in-time.

Likewise, in some embodiments, more than one assessment model may be directed to the same or similar type of mirage. Accordingly, in some embodiments, if assessment models are directed at the same type of mirage, models that consume less resources (or faster) may be sequenced to be applied before models that consume more resources are executed.

Also, in some embodiments, assessment engines may be arranged to sequence assessment models based on one or more recency rules. In some embodiment, assessment engines may be arranged to track or log mirage history for individual authors, data sources, data models, organizations, visualization classes, or the like. Accordingly, in one or more of the various embodiments, mirage history may be considered to sequence or sort assessment models. For example, in some embodiments, if a particular visualization author has a history of introducing a particular class of mirages, assessment models used for discovering such mirages may be executed first.

However, in some embodiments, assessment engines may be arranged to employ rules, instructions, or the like, provided via configuration information may be employed to account for local circumstances or conditions.

At block 1106, in one or more of the various embodiments, the assessment engine may be arranged to render one or more test visualizations based on the current assessment model. As described above, assessment models may include one or more instructions for generating test visualizations based on the same data used to generate the original visualization. For example, in some embodiments, an assessment model may define rules to generate a modified visualization model that may be employed to generate test visualizations, such as, swapping axis, adjusting base line values, sampling data values to use in aggregates, varying the order of plotting of different marks, or the like, or combination thereof. In some embodiments, additional fields from the data source(s) may be included or substituted to generate a test visualization.

At block 1108, in one or more of the various embodiments, the assessment engine may be arranged to compare the original visualization with the test visualization to determine if there may be mirages included in the original visualization.

In one or more of the various embodiments, the particular comparison as well as the relevant criteria may depend on the given assessment model. Accordingly, in some embodiments, as described above, assessment models may include or reference one or more rules, instructions, conditions, parameters, or the like, that may determine how a comparison may be performed and how the results of a comparison may be interpreted.

In one or more of the various embodiments, a comparison may include generating or rendering flattened images (e.g., bitmaps, or the like) that may enable various machine vision or statistical analysis to be performed to compare original visualizations with test visualizations.

In some embodiments, assessment engines may be arranged to execute conventional machine vision methods to quantify various differences between the original visualizations or the test visualizations. For example, in some embodiments, if a visualization is robust (e.g., visualizations absent mirages), minor changes to the data or visualization model should be expected to produce minor changes to the appearance of the visualization. Likewise, in many cases, non-substantive changes to a the appearance of a visualization (e.g., colors, plot order, orientation, or the like) made to otherwise robust visualizations should produce minor changes to the appearance of the visualization.

At decision block 1110, in one or more of the various embodiments, if the deviation between the original visualization and one or more test visualizations exceeds a defined threshold values, control may flow to block 1112; otherwise, control may flow to decision block 1114. As described above, assessment models may be arranged to produce an assessment score that may represent the probability or confidence score that a particular mirage has been detected.

At block 1112, in one or more of the various embodiments, the assessment engine may be arranged to associate assessment information, including an assessment score with the original visualization. Accordingly, in some embodiments, the associated assessment information may be provided to users or authors of the assessed visualizations. For example, if mirage may be detected, a report that indicates the type of mirages, the data or appearance changes that enabled the discovery of the mirages, or the like, may be generated or provided to one or more users.

In one or more of the various embodiments, assessment models may be arranged to provide assessment scores, or the like, that may indicate the strength or quality of the determination (e.g., confidence scores). Thus, in one or more of the various embodiments, the assessment engine may employ the assessment score provided by assessment models rather than a specific deviation value between the original visualization and the test visualization.

At decision block 1114, in one or more of the various embodiments, if there may be morel assessment models to execute, control may loop back to block 1104; otherwise, control may be returned to a calling process.

Figure 12:
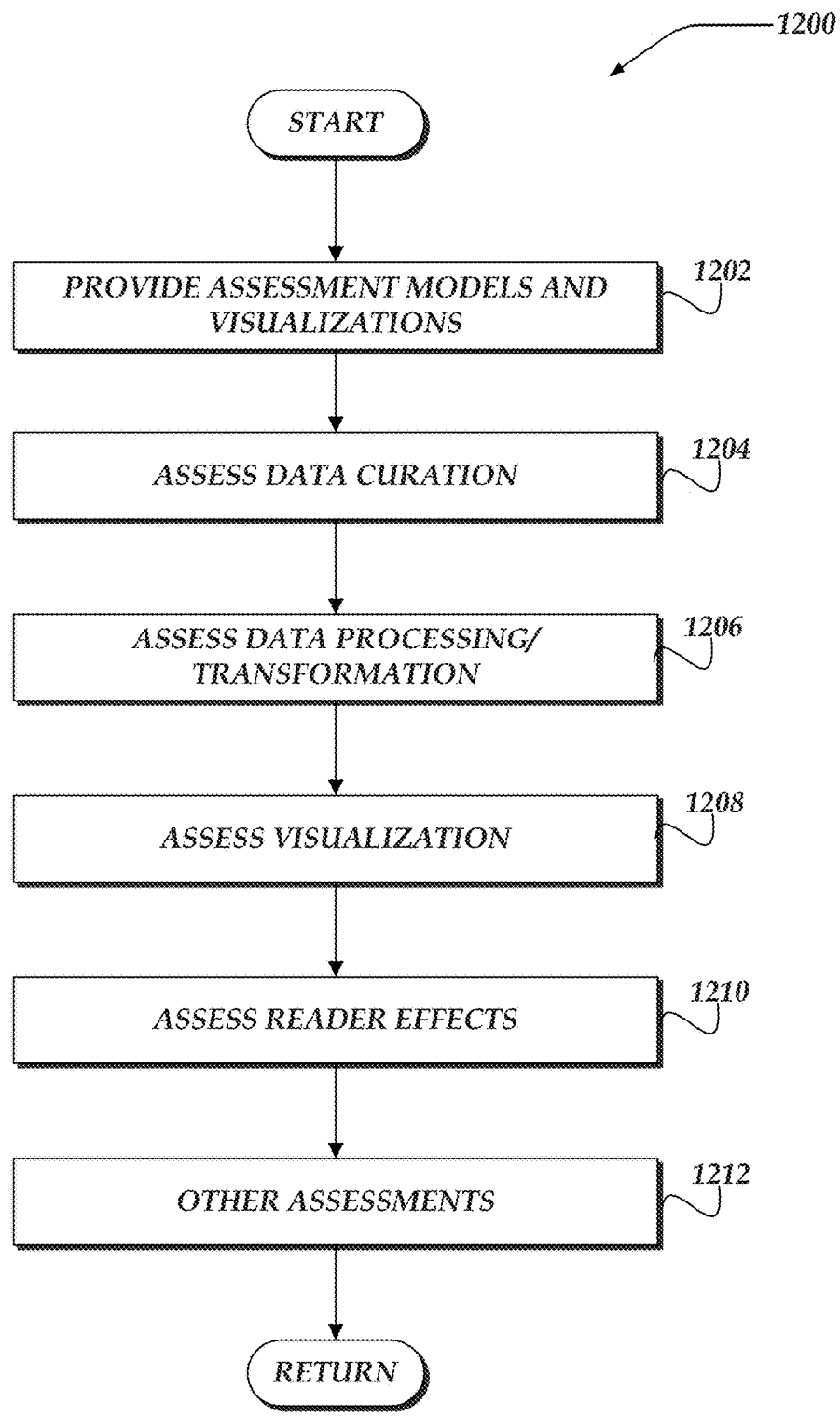
FIG. 12 illustrates a flowchart of a process for assessing visualizations to that may include one or more visualization mirages in accordance with one or more of the various embodiments.

FIG. 12 illustrates a flowchart of process 1200 for assessing visualizations to that may include one or more visualization mirages in accordance with one or more of the various embodiments. After a start block, at block 1202, in one or more of the various embodiments, an assessment engine may be provided one or more assessment models and one or more visualizations. As described above, in some embodiments, one or more assessment models may be defined for detecting visualization mirages. Accordingly, in some embodiments, the assessment engine may be arranged to obtain one or more assessment models from a data store, or the like. In some embodiments, assessment engines may be arranged to determine the particular assessment models based on rules, conditions, or the like, that may be provided via configuration information.

In one or more of the various embodiments, assessment engines may be arranged to employ a pipeline of different assessment models to evaluate if a visualization may be associated one or more mirages. In some embodiments, each stage of the pipeline may be associated different stages of information processing the contributed to the final visualization. In some embodiments, each stage of this pipeline may enable the introduction of visualization mirages. Accordingly, in some embodiments, assessment models may be designed or configured for each stage of the pipeline.

At block 1204, in one or more of the various embodiments, the assessment engine may be arranged to execute one or more assessment models that may be directed to data curation. Accordingly, in one or more of the various embodiments, assessment models may be arranged to evaluate various characteristics of the curation of the data used to generate the visualization. In some embodiments, this may include evaluating the various features of the source data that the visualization may be based on, such as, missing or repeated records, outliers, spelling mistakes, drill-down bias, or the like.

In one or more embodiments, missing or repeated records may be of interest because users may often assume that there may be one and only one entry for each datum associated with a visualization. However, in some cases, errors in data entry or integration may result in missing or repeated values that may result in inaccurate aggregates or groupings.

In one or more of the various embodiments, outliers may be of interest because many forms of analysis may assume data have similar magnitudes and were generated by similar processes. Thus, in some embodiments, outliers, whether in the form of erroneous or unexpectedly extreme values, may greatly impact aggregation and discredit the assumptions behind many statistical tests and summaries.

In one or more of the various embodiments, spelling mistakes may be of interest because in some cases columns of strings may be interpreted as categorical data for the purposes of aggregation. Thus, in some embodiments, if interpreted in this way, typos or inconsistent spelling and capitalization can create spurious categories, remove important data from aggregate queries, or the like.

In one or more of the various embodiments, drill-down bias may be of interest because users assume that the order in which data is investigated should not impact their conclusions. However, in some cases, by filtering on less explanatory or relevant variables first, the full scope of the impact of later variables may be hidden. Thus, in some embodiments, this may result in insights that address only small parts of the data, when they might be true of the larger whole.

At block 1206, in one or more of the various embodiments, the assessment engine may be arranged to execute one or more assessment models that may be directed to data processing or data transformation.

Accordingly, in one or more of the various embodiments, assessment models may be arranged to analyze the data processing for the presence of differing number of records by group. In some embodiments, these may be of interest because certain summary statistics, including aggregates, may be sensitive to sample size. However, the number of records aggregated into a single visualization mark may vary dramatically. In some cases, this mismatch can mask sensitivity and interfere with per-mark comparisons. Also, in some embodiments, if combined with differing levels of aggregation, it may result in counter-intuitive results such as Simpson's Paradox.

In one or more of the various embodiments, assessment models may be arranged to determine the extent of cherry picked data that may be used in a visualization. In some embodiments, filtering and sub-setting are meant to be tools to remove irrelevant data, or allow the user to focus on a particular area of interest. However, if this filtering is too aggressive, or if the user focuses on individual examples rather than the general trend, this cherry-picking may promote erroneous conclusions or biased views of the relationships between variables. Thus, in some embodiments, failing to keep the broader dataset in context may result in the Texas Sharpshooter Fallacy or other forms of HARKing.

In one or more of the various embodiments, assessment models may be arranged to determine the extent of how degrees of freedom may have influenced the visualization. In some embodiments, this may be of interest because users that author visualization may have a tremendous flexibility in how they analyze the data. In some embodiments, such "researcher degrees of freedom" may create conclusions that may be highly idiosyncratic to the choices made by the analyst, or in a malicious sense promote "p-hacking" where the analyst searches through the parameter space in order to find the best support for a pre-ordained conclusion. In some embodiments, a related issue that may be encountered is the "multiple comparisons problem" where the user makes so many choices that at least one configuration, just by happenstance, is likely to appear significant, even if there is no strong signal in the data.

In one or more of the various embodiments, assessment models may be arranged to determine the extent of confusing imputation may have influenced the visualization. In some embodiments, this may be of interest because there are many strategies for dealing with missing or incomplete data, including the imputation of new values. Accordingly, in some embodiments, how values are imputed, and then how these imputed values are visualized in the context of the rest of the data, can impact how the data are perceived, that may create spurious trends or group differences that may be merely artifacts of how missing values are handled prior to visualization.

At block 1208, in one or more of the various embodiments, the assessment engine may be arranged to assess the visualization. In one or more of the various embodiments, assessment models may be arranged to determine if the appearance of the visualization may contribute to one or more visualization mirages.

In one or more of the various embodiments, assessment models may be arranged to evaluate if the visualization includes non-sequitur visualizations. In some embodiments, these may be of interest because users expect graphics that appear to be charts to be a mapping between data and image. In some cases, visualizations being used as decoration (in which the marks are not related to data) present non-information that might be mistaken for real information. Accordingly, in some cases, even if the data are accurate, additional unjustified annotations could produce misleading impressions, such as decorating uncorrelated data with a spurious line of best fit. or the like.

In one or more of the various embodiments, assessment models may be arranged to evaluate if the visualization includes over-plotting. In some embodiments, this may be of interest because users typically expect to be able to clearly identify individual marks in visualizations, and expect that one visual mark corresponds to a single value or aggregated value. Yet, in some cases, overlapping marks can hide internal structures in the distribution or disguise potential data quality issues.

In one or more of the various embodiments, assessment models may be arranged to evaluate if the visualization includes concealed uncertainty. In some embodiments, this may be of interest because visualizations that fail to indicate that they contain uncertainty risk may give a false impression as well a possible extreme mistrust of the data if the reader realizes the information has not been presented clearly. In some cases, there is also a tendency to incorrectly assume that data is high quality or complete, even without evidence of this veracity.

In one or more of the various embodiments, assessment models may be arranged to evaluate if the visualization includes manipulation of scales. In some embodiments, this may be of interest because the axes and scales of a visualization are presumed by users to straightforwardly represent quantitative information. However, manipulation of these scales (for instance, by flipping them from their commonly assumed directions, truncating or expanding them with respect to the range of the data, using non-linear transforms, employing dual axes, or the like may cause viewers to misinterpret the data in a chart, for instance by exaggerating correlation, exaggerating effect size, misinterpreting the direction of effects, or the like.

At block 1210, in one or more of the various embodiments, the assessment engine may be arranged to assess reader effects that may be associated with the visualization.

In one or more of the various embodiments, assessment models may be arranged to evaluate if the visualization includes base rate bias. In some embodiments, this may be of interest because users may assume unexpected values in a visualization are emblematic of reliable differences. However, in some cases, readers may be unaware of relevant base rates: either the relative likelihood of what is seen as a surprising value or the false discovery rate of the entire analytic process.

In one or more of the various embodiments, assessment models may be arranged to evaluate if the visualization relies on one or more inaccessible visualizations. In some embodiments, this may be of interest because visualization authors may assume that the users may be homogeneous groups. Yet, the way that some people read visualizations may be heterogeneous and dependent on underlying perceptual abilities and cognitive backgrounds that may be overlooked by the visualization author. Accordingly, in some embodiments, insufficient mindfulness of these differences may result in miscommunication. For example, for some embodiments, a user with a color vision deficiency may interpret two colors as identical when the visualization author intended them to be separate.

In one or more of the various embodiments, assessment models may be arranged to evaluate if the visualization may include anchoring effects. In some embodiments, this may be of interest because initial framings of information tend to guide subsequent judgments. In some cases, this may cause readers to place undue rhetorical weight on early observations, which may cause them to undervalue or distrust later observations.

In one or more of the various embodiments, assessment models may be arranged to evaluate if the visualization may promote bias in interpretation. In some embodiments, this may be of interest because each viewer arrives to a visualization with their own preconceptions, biases, and epistemic frameworks. Accordingly, in some embodiments, if these biases are not carefully considered, various cognitive biases such as the backfire effect or confirmation bias can cause viewers to anchor on only the data (or the reading of the data) that supports their preconceived notions, reject data that does not accord with their views, and generally ignore a more holistic picture of the strength of the evidence.

At block 1212, in one or more of the various embodiments, the assessment engine may be arranged to execute one or more other assessment models that may be directed to the same or other sources of visualization mirages.

Accordingly, in some embodiments, assessment engines may be arranged to employ one or more rules, instructions, conditions, or the like, that may be provided by configuration information to account for local circumstances, including acquiring or otherwise determining one or more customized or localization assessment models.

Next, in one or more of the various embodiments, control may be returned to a calling process.

It will be understood that each block in each flowchart illustration, and combinations of blocks in each flowchart illustration, can be implemented by computer program instructions. These program instructions may be provided to a processor to produce a machine, such that the instructions, which execute on the processor, create means for implementing the actions specified in each flowchart block or blocks. The computer program instructions may be executed by a processor to cause a series of operational steps to be performed by the processor to produce a computer-implemented process such that the instructions, which execute on the processor, provide steps for implementing the actions specified in each flowchart block or blocks. The computer program instructions may also cause at least some of the operational steps shown in the blocks of each flowchart to be performed in parallel. Moreover, some of the steps may also be performed across more than one processor, such as might arise in a multi-processor computer system. In addition, one or more blocks or combinations of blocks in each flowchart illustration may also be performed concurrently with other blocks or combinations of blocks, or even in a different sequence than illustrated without departing from the scope or spirit of the invention.

Accordingly, each block in each flowchart illustration supports combinations of means for performing the specified actions, combinations of steps for performing the specified actions and program instruction means for performing the specified actions. It will also be understood that each block in each flowchart illustration, and combinations of blocks in each flowchart illustration, can be implemented by special purpose hardware-based systems, which perform the specified actions or steps, or combinations of special purpose hardware and computer instructions. The foregoing example should not be construed as limiting or exhaustive, but rather, an illustrative use case to show an implementation of at least one of the various embodiments of the invention.

Further, in one or more embodiments (not shown in the figures), the logic in the illustrative flowcharts may be executed using an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. In one or more embodiments, a microcontroller may be arranged to directly execute its own embedded logic to perform actions and access its own internal memory and its own external Input and Output Interfaces (e.g., hardware pins or wireless transceivers) to perform actions, such as System On a Chip (SOC), or the like.

What is claimed as new and desired to be protected by Letters Patent of the United States is:

1. A method for managing visualizations of data using one or more processors that execute instructions to perform actions, comprising:
   determining one or more visualizations based on data from a data source;
   determining one or more assessment models based on the one or more visualizations, wherein the one or more assessment models are arranged to detect one or more mirages in the one or more visualizations, and wherein the one or more mirages are visually misleading presentations of one or more relationships for the data in the one or more visualizations;
   determining one or more assessment results based on the one or more assessment models and an amount of variability in the one or more relationships in the one or more visualizations for a plurality of different changes that are tested for each individual visualization and metamorphic manipulations with the data and without domain knowledge of each individual visualization, wherein each assessment result includes an assessment score that corresponds to a detection of the one or more mirages, and wherein the mirage detection includes determining one or more of a large geometric variation in a display of each individual visualization for the provided data having a plurality of axis, or one or marks representing different ranges of the data;
   determining one or more visualization models based on the one or more assessment models, wherein the one or more visualization models are arranged to provide one or more of a user interface style, or a user interface feature, or a narrative explanation that is associated with the one or more assessment models;
   determining geolocation information provided by one or more of a geolocation protocol or a global positioning system device to generate one or more user interface features for localization of one or more of a user interface, a dashboard, a visualization, or a report; and generating a report for a user that includes one or more of a user interface style or a user interface localization feature and an ordered list of the one or more assessment results that corresponds to the one or more mirages and the one or more narrative text explanations associated with the one or more assessment models that are employed to determine the one or more assessment results, wherein the ordered list is generated by detecting and ordering, for the user, the one or more mirages without providing the user with access to the data in the one or more visualizations, and wherein the assessment score corresponds to detection of the one or more mirages for a displayed visualization than includes one or more of the user interface localization feature, the user interface style and an indication to the user of a likelihood of counter-intuitive results based on one or more of a non-sequitur visualization, a bias, a manipulated scale, a masked sensitivity, or an interference with a comparison of the provided data.

2. The method of claim 1, wherein employing the one or more assessment models to determine the one or more assessment results, further comprises,
generating one or more test visualizations based on the one or more visualizations, wherein each test visualization is modified based on the one or more assessment models;
comparing relationship variability differences of the one or more test visualizations to the one or more visualizations; and
determining the probability score that corresponds to detection of the one or more mirages based on the comparison, wherein the value of the probability is proportional to the magnitude of the compared relationship variability differences.

3. The method of claim 1, wherein employing the one or more assessment models to determine the one or more assessment results, further comprises, evaluating the data associated with the one or more visualizations to determine one or more of missing or repeated records, spelling mistakes, drill-down bias, differing number of records by group, or misleading data selection.

4. The method of claim 1, wherein employing the one or more assessment models to determine the one or more assessment results, further comprises, evaluating the one or more visualizations to determine one or more types of mirage, including one or more of non-sequitur visualizations, over-plotting, concealed uncertainty, or manipulation of scales.

5. The method of claim 1, wherein employing the one or more assessment models to determine the one or more assessment results, further comprises:
evaluating data associated with the one or more visualizations that is included in the data source and omitted from the one or more visualization; and
generating a portion of the one or more assessment results based on the evaluation.

6. The method of claim 1, wherein providing the report, further comprises, generating one or more other visualizations that are associated with one or more of the one or more assessment models, the one or more assessment results, or the one or more mirages.

7. A processor readable non-transitory storage media that includes instructions for managing visualizations, wherein execution of the instructions by one or more processors, performs actions, comprising:
determining one or more visualizations based on data from a data source;
determining one or more assessment models based on the one or more visualizations, wherein the one or more assessment models are arranged to detect one or more mirages in the one or more visualizations, and wherein the one or more mirages are visually misleading presentations of one or more relationships for the data in the one or more visualizations;
determining one or more assessment results based on the one or more assessment models and an amount of variability in the one or more relationships in the one or more visualizations for a plurality of different changes that are tested for each individual visualization and metamorphic manipulations with the data and without domain knowledge of each individual visualization, wherein each assessment result includes an assessment score that corresponds to a detection of the one or more mirages, and wherein the mirage detection includes determining one or more of a large geometric variation in a display of each individual visualization for the provided data having a plurality of axis, or one or marks representing different ranges of the data;
determining one or more visualization models based on the one or more assessment models, wherein the one or more visualization models are arranged to provide one or more of a user interface style, or a user interface feature, or a narrative explanations that is associated with the one or more assessment models;
determining geolocation information provided by one or more of a geolocation protocol or a global positioning system device to generate one or more user interface features for localization of one or more of a user interface, a dashboard, a visualization, or a report; and
generating a report for a user that includes one or more of a user interface style or a user interface localization feature and an ordered list of the one or more assessment results that corresponds to the one or more mirages and the one or more narrative text explanations associated with the one or more assessment models that are employed to determine the one or more assessment results, wherein the ordered list resources is generated by detecting and ordering, for the user, the one or more mirages without providing the user with access to the data in the one or more visualizations, and wherein the assessment score corresponds to detection of the one or more mirages for a displayed visualization than includes one or more of the user interface localization feature, the user interface style and an indication to the user of a likelihood of counter-intuitive results based on one or more of a non-sequitur visualization, a bias, a manipulated scale, a masked sensitivity, or an interference with a comparison of the provided data.

8. The media of claim 7, wherein employing the one or more assessment models to determine the one or more assessment results, further comprises,
generating one or more test visualizations based on the one or more visualizations, wherein each test visualization is modified based on the one or more assessment models;
comparing relationship variability differences of the one or more test visualizations to the one or more visualizations; and
determining the probability score that corresponds to detection of the one or more mirages based on the comparison, wherein the value of the probability is proportional to the magnitude of the compared relationship variability differences.

9. The media of claim 7, wherein employing the one or more assessment models to determine the one or more assessment results, further comprises, evaluating the data associated with the one or more visualizations to determine one or more of missing or repeated records, spelling mistakes, drill-down bias, differing number of records by group, or misleading data selection.

10. The media of claim 7, wherein employing the one or more assessment models to determine the one or more assessment results, further comprises, evaluating the one or more visualizations to determine one or more types of mirage, including one or more of non-sequitur visualizations, over-plotting, concealed uncertainty, or manipulation of scales.

11. The media of claim 7, wherein employing the one or more assessment models to determine the one or more assessment results, further comprises:
evaluating data associated with the one or more visualizations that is included in the data source and omitted from the one or more visualization; and
generating a portion of the one or more assessment results based on the evaluation.

12. The media of claim 7, wherein providing the report, further comprises, generating one or more other visualizations that are associated with one or more of the one or more assessment models, the one or more assessment results, or the one or more mirages.

13. A system for managing visualizations:
a network computer, comprising:
a memory that stores at least instructions; and
one or more processors that execute instructions that perform actions, including:
determining one or more visualizations based on data from a data source;
determining one or more assessment models based on the one or more visualizations, wherein the one or more assessment models are arranged to detect one or more mirages in the one or more visualizations, and wherein the one or more mirages are visually misleading presentations of one or more relationships for the data in the one or more visualizations;
determining one or more assessment results based on the one or more assessment models and an amount of variability in the one or more relationships in the one or more visualizations for a plurality of different changes that are tested for each individual visualization and metamorphic manipulations with the data and without domain knowledge of each individual visualization, wherein each assessment result includes an assessment score that corresponds to a detection of the one or more mirages, and wherein the mirage detection includes determining one or more of a large geometric variation in a display of each individual visualization for the provided data having a plurality of axis, or one or marks representing different ranges of the data;
determining one or more visualization models based on the one or more assessment models, wherein the one or more visualization models are arranged to provide one or more of a user interface style, or a user interface feature, or a narrative explanations that is associated with the one or more assessment models;
determining geolocation information provided by one or more of a geolocation protocol or a global positioning system device to generate one or more user interface features for localization of one or more of a user interface, a dashboard, a visualization, or a report; and
generating a report for a user that includes one or more of a user interface style or a user interface localization feature and an ordered list of the one or more assessment results that corresponds to the one or more mirages and the one or more narrative text explanations associated with the one or more assessment models that are employed to determine the one or more assessment results, wherein the ordered list is generated by detecting and ordering, for the user, the one or more mirages without providing the user with access to the data in the one or more visualizations, and wherein the assessment score corresponds to detection of the one or more mirages for a displayed visualization than includes one or more of the user interface localization feature, the user interface style and an indication to the user of a likelihood of counter-intuitive results based on one or more of a non-sequitur visualization, a bias, a manipulated scale, a masked sensitivity, or an interference with a comparison of the provided data; and
a client computer, comprising:
a transceiver that communicates over the network;
a memory that stores at least instructions; and
one or more processors that execute instructions that perform actions, including:
receiving the report.

14. The system of claim 13, wherein employing the one or more assessment models to determine the one or more assessment results, further comprises,
generating one or more test visualizations based on the one or more visualizations, wherein each test visualization is modified based on the one or more assessment models;
comparing relationship variability differences of the one or more test visualizations to the one or more visualizations; and
determining the probability score that corresponds to detection of the one or more mirages based on the comparison, wherein the value of the probability is proportional to the magnitude of the compared relationship variability differences.

15. The system of claim 13, wherein employing the one or more assessment models to determine the one or more assessment results, further comprises, evaluating the data associated with the one or more visualizations to determine one or more of missing or repeated records, spelling mistakes, drill-down bias, differing number of records by group, or misleading data selection.

16. The system of claim 13, wherein employing the one or more assessment models to determine the one or more assessment results, further comprises, evaluating the one or more visualizations to determine one or more types of mirage, including one or more of non-sequitur visualizations, over-plotting, concealed uncertainty, or manipulation of scales.

17. The system of claim 13, wherein employing the one or more assessment models to determine the one or more assessment results, further comprises:
evaluating data associated with the one or more visualizations that is included in the data source and omitted from the one or more visualization; and generating a portion of the one or more assessment results based on the evaluation.

18. The system of claim 13, wherein providing the report, further comprises, generating one or more other visualizations that are associated with one or more of the one or more assessment models, the one or more assessment results, or the one or more mirages.

19. A network computer for managing visualizations, comprising:
a memory that stores at least instructions; and
one or more processors that execute instructions that perform actions, including:
determining one or more visualizations based on data from a data source;
determining one or more assessment models based on the one or more visualizations, wherein the one or more assessment models are arranged to detect one or more mirages in the one or more visualizations, and wherein the one or more mirages are visually misleading presentations of one or more relationships for the data in the one or more visualizations;
determining one or more assessment results based on the one or more assessment models and an amount of variability in the one or more relationships in the one or more visualizations for a plurality of different changes that are tested for each individual visualization and metamorphic manipulations with the data and without domain knowledge of each individual visualization, wherein each assessment result includes an assessment score that corresponds to a detection of the one or more mirages, and wherein the mirage detection includes determining one or more of a large geometric variation in a display of each individual visualization for the provided data having a plurality of axis, or one or marks representing different ranges of the data;
determining one or more visualization models based on the one or more assessment models, wherein the one or more visualization models are arranged to provide one or more of a user interface style, or a user interface feature, or a narrative explanations that is associated with the one or more assessment models;
determining geolocation information provided by one or more of a geolocation protocol or a global positioning system device to generate one or more user interface features for localization of one or more of a user interface, a dashboard, a visualization, or a report; and
generating a report for a user that includes one or more of a user interface style or a user interface localization feature and an ordered list of the one or more assessment results that corresponds to the one or more mirages and the one or more narrative text explanations associated with the one or more assessment models that are employed to determine the one or more assessment results, wherein the ordered list is generated by detecting and ordering, for the user, the one or more mirages without providing the user with access to the data in the one or more visualizations, and wherein the assessment score corresponds to detection of the one or more mirages for a displayed visualization than includes one or more of the user interface localization feature, the user interface style and an indication to the user of a likelihood of counter-intuitive results based on one or more of a non-sequitur visualization, a bias, a manipulated scale, a masked sensitivity, or an interference with a comparison of the provided data.

20. The network computer of claim 19, wherein employing the one or more assessment models to determine the one or more assessment results, further comprises,
generating one or more test visualizations based on the one or more visualizations, wherein each test visualization is modified based on the one or more assessment models;
comparing relationship variability differences of the one or more test visualizations to the one or more visualizations; and
determining the probability score that corresponds to detection of the one or more mirages based on the comparison, wherein the value of the probability is proportional to the magnitude of the compared relationship variability differences.

21. The network computer of claim 19, wherein employing the one or more assessment models to determine the one or more assessment results, further comprises, evaluating the data associated with the one or more visualizations to determine one or more of missing or repeated records, spelling mistakes, drill-down bias, differing number of records by group, or misleading data selection.

22. The network computer of claim 19, wherein employing the one or more assessment models to determine the one or more assessment results, further comprises, evaluating the one or more visualizations to determine one or more types of mirage, including one or more of non-sequitur visualizations, over-plotting, concealed uncertainty, or manipulation of scales.

23. The network computer of claim 19, wherein employing the one or more assessment models to determine the one or more assessment results, further comprises:
evaluating data associated with the one or more visualizations that is included in the data source and omitted from the one or more visualization; and
generating a portion of the one or more assessment results based on the evaluation.

24. The network computer of claim 19, wherein providing the report, further comprises, generating one or more other visualizations that are associated with one or more of the one or more assessment models, the one or more assessment results, or the one or more mirages.

* * * * *